(12) United States Patent
Matsagkos et al.

(10) Patent No.: US 12,486,701 B2
(45) Date of Patent: Dec. 2, 2025

(54) SINGLE PART HINGE, AND RELATED METHODS AND USES

(71) Applicant: OCADO INNOVATION LIMITED, Hatfield (GB)

(72) Inventors: Alexandros Matsagkos, Hatfield (GB); Jesus Espinosa, Hatfield (GB); Arvid Hallje, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 18/686,573

(22) PCT Filed: Aug. 24, 2022

(86) PCT No.: PCT/EP2022/073624
§ 371 (c)(1),
(2) Date: Feb. 26, 2024

(87) PCT Pub. No.: WO2023/025860
PCT Pub. Date: Mar. 2, 2023

(65) Prior Publication Data
US 2025/0129646 A1    Apr. 24, 2025

(30) Foreign Application Priority Data
Aug. 25, 2021    (GB) .................................... 2112158

(51) Int. Cl.
*E05D 1/02* (2006.01)
*E05D 11/10* (2006.01)
(Continued)

(52) U.S. Cl.
CPC ............ *E05D 1/02* (2013.01); *E05D 11/1028* (2013.01); *F16C 11/12* (2013.01); *B65G 1/0478* (2013.01); *B65G 1/0492* (2013.01)

(58) Field of Classification Search
CPC . F16C 11/10; F16C 11/12; E05D 1/02; E05D 11/1028
(Continued)

(56) References Cited

U.S. PATENT DOCUMENTS 2,793,028 A * 5/1957 Wheeler ................... F16F 1/02
74/519
3,032,808 A * 5/1962 Fleming ................... E05D 1/02
16/280
(Continued)

FOREIGN PATENT DOCUMENTS

AU    2021231546 B2 *  6/2024 ............... B60B 5/02
CN    112576128 A      3/2021
(Continued)

OTHER PUBLICATIONS

Office Action issued on May 16, 2024, by the Great Britain Patent Office in corresponding Great Britain Patent Application No. GB2112158.7. (4 pages).
(Continued)

*Primary Examiner* — Jeffrey O'Brien
(74) *Attorney, Agent, or Firm* — Buchanan Ingersoll & Rooney PC

(57) ABSTRACT

A single part hinge, method of manufacturing and load handling device are provided. The single part hinge can include a first portion and a second portion; a flexural arrangement, connecting a first end of the first portion to a first end of the second portion; wherein the single part hinge is rotationally movable about a pivot point at the first end of the first portion, and moveable between a first position and a second position, wherein in the first position, rotation is limited by a first support region and in the second position, rotation is limited by a second support region.

12 Claims, 17 Drawing Sheets

(51) Int. Cl.
*F16C 11/12* (2006.01)
*B65G 1/04* (2006.01)

(58) Field of Classification Search
USPC .......................................... 16/225, 226, 227
See application file for complete search history.

(56) References Cited

U.S. PATENT DOCUMENTS

| | | | | | |
|---|---|---|---|---|---|
| 3,629,901 | A * | 12/1971 | Wolf | ...................... | E05D 1/02 |
| | | | | | 220/838 |
| 4,027,714 | A * | 6/1977 | Dixon | ...................... | E06B 3/94 |
| | | | | | 312/258 |
| 4,799,727 | A * | 1/1989 | Robbins | ...................... | E05D 1/02 |
| | | | | | 296/147 |
| 4,813,560 | A * | 3/1989 | Begley | ............... | B65D 47/0814 |
| | | | | | 220/838 |
| 4,825,713 | A * | 5/1989 | Wilkey | ................... | G01C 19/22 |
| | | | | | 74/5 F |
| 4,919,993 | A * | 4/1990 | Woodruff | ............ | G01P 15/0802 |
| | | | | | 216/2 |
| 4,953,834 | A * | 9/1990 | Ebert | ...................... | F16C 11/12 |
| | | | | | 216/2 |
| 5,450,694 | A * | 9/1995 | Goranson | ............. | E04B 2/7429 |
| | | | | | 52/71 |
| 5,513,909 | A * | 5/1996 | Teich | ...................... | E05D 5/023 |
| | | | | | 312/351.6 |
| 6,215,081 | B1 * | 4/2001 | Jensen | ...................... | H01H 3/46 |
| | | | | | 200/341 |
| 6,283,666 | B1 * | 9/2001 | Genequand | ............. | F16C 11/12 |
| | | | | | 439/492 |
| 6,574,834 | B2 * | 6/2003 | Fedon | ...................... | E05D 1/02 |
| | | | | | 220/829 |
| 6,615,451 | B1 * | 9/2003 | Goranson | ............. | E04B 2/7429 |
| | | | | | 16/225 |
| 6,634,060 | B1 * | 10/2003 | Lagler | ...................... | E05D 1/02 |
| | | | | | 220/837 |
| 7,044,459 | B2 * | 5/2006 | Watson | ................... | F16C 11/12 |
| | | | | | 267/257 |
| 7,047,576 | B2 * | 5/2006 | Tavivian | ................... | A47K 3/30 |
| | | | | | 4/596 |
| 7,328,481 | B2 * | 2/2008 | Barnett | ...................... | E05D 3/12 |
| | | | | | 16/227 |
| 7,451,950 | B2 * | 11/2008 | Perez-Sanchez | ......... | B64C 9/02 |
| | | | | | 16/225 |
| 8,056,868 | B2 * | 11/2011 | Vander Griend | ..... | F16L 3/1075 |
| | | | | | 248/68.1 |
| 8,191,204 | B2 * | 6/2012 | Belfiore | ................... | E05D 1/02 |
| | | | | | 16/385 |
| 8,708,593 | B2 * | 4/2014 | Stratton | ................... | F16C 11/12 |
| | | | | | 403/220 |
| 9,212,691 | B2 * | 12/2015 | Smith | ...................... | F16C 11/12 |
| 10,060,469 | B2 * | 8/2018 | Jimenez | ................. | F16M 11/38 |
| 10,724,675 | B2 * | 7/2020 | Lazzaro | ................... | F16C 11/12 |
| 11,143,231 | B2 * | 10/2021 | Lazzaro | ................. | G02B 7/182 |
| 11,193,551 | B2 * | 12/2021 | Jahromi | ..................... | F16F 7/00 |
| 11,274,697 | B2 * | 3/2022 | Srour | ..................... | F16F 1/428 |
| 11,432,836 | B2 * | 9/2022 | Dearden | ................. | A61B 17/29 |
| 2016/0194151 | A1 | 7/2016 | Lindbo et al. | | |
| 2018/0178980 | A1 | 6/2018 | Lindbo et al. | | |
| 2018/0178981 | A1 | 6/2018 | Lindbo et al. | | |
| 2020/0240462 | A1 | 7/2020 | Cosandier et al. | | |
| 2020/0307908 | A1 | 10/2020 | Lindbo et al. | | |
| 2021/0047111 | A1 | 2/2021 | Lindbo et al. | | |
| 2021/0086992 | A1 | 3/2021 | Lindbo et al. | | |
| 2021/0086993 | A1 | 3/2021 | Lindbo et al. | | |
| 2022/0154766 | A1 * | 5/2022 | Panas | ...................... | F16C 11/12 |
| 2022/0298838 | A1 * | 9/2022 | Wood | ...................... | E05D 7/00 |
| 2024/0337286 | A1 * | 10/2024 | Bowden | .................. | F16C 11/12 |

FOREIGN PATENT DOCUMENTS

| | | |
|---|---|---|
| GB | 2520104 A | 5/2015 |
| JP | H1177212 A | 7/1989 |
| JP | 2012514703 A | 6/2012 |
| WO | 2010078520 A2 | 7/2010 |
| WO | 2020237376 A1 | 12/2020 |

OTHER PUBLICATIONS

Office Action issued on Apr. 1, 2025 by the Japanese Patent Office in corresponding Japanese Application No. 2024-512149 (8 pages) corresponding to Applicant's U.S. Appl. No. 18/686,573.

International Search Report (PCT/ISA/210) and Written Opinion (PCT/ISA/237) mailed on Nov. 17, 2022, by the European Patent Office as the International Searching Authority for International Application No. PCT/EP2022/073624.

Patents Act 1977: Search Report under Section 17 in corresponding Application No. GB2112158.7 issued Feb. 16, 2022.

* cited by examiner

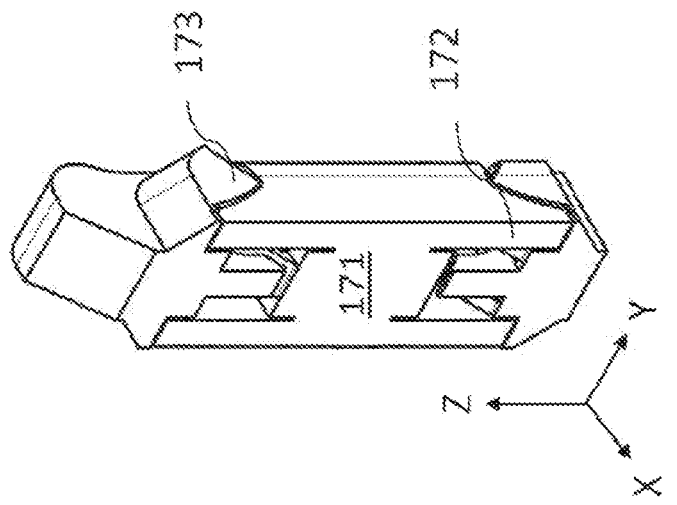
Figure 15g
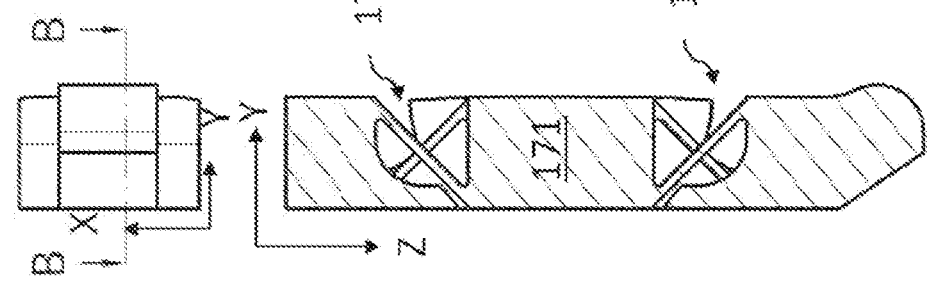
Figure 15h
B - B
Figure 15i
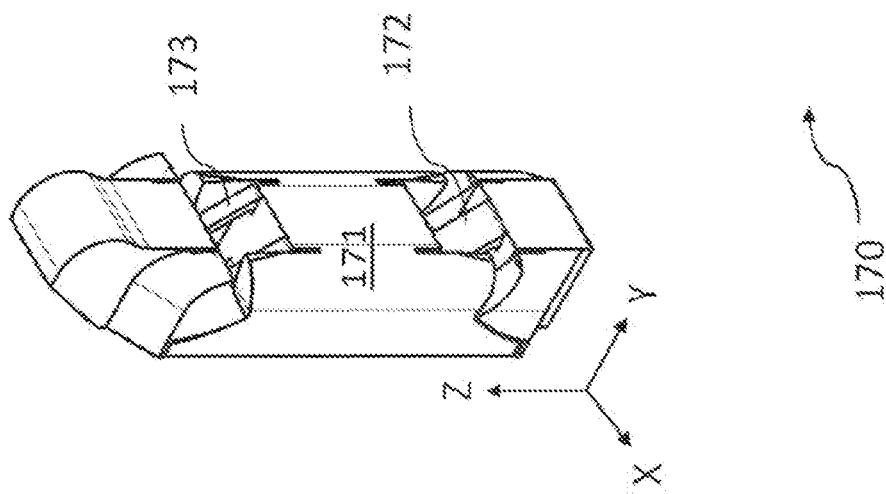
Figure 15f

SINGLE PART HINGE, AND RELATED METHODS AND USES

FIELD OF THE INVENTION

The present invention relates to a single part hinge. More specifically but not exclusively, the invention relates to a single part flexural hinge mechanism and method of manufacture.

BACKGROUND

Robotic load-handling devices are described in UK Patent Application No. GB2520104A (Ocado Innovation Limited). Such load-handling devices are controllably moved on a track system forming a grid above stacks of bins or containers. A given load-handling device lifts a target container from the top of a stack, the target container containing inventory items needed to fulfil a customer order. The load-handing device comprises a first set of wheels and a second set of wheels for engaging with the x-direction track and the y-direction track respectively. For moving in the x-direction, the x-direction wheels are engaged with the track, while the y-direction wheels are raised. Similarly, for moving in the y-direction the y direction wheels are engaged with the track while the x-direction wheels are raised. The transition between x- and y-direction movements is controlled by a direction-change mechanism. It is essential that a direction-change mechanism is robust, reliable and able to support the weight of the load-handling device and a target container, and that it is able to withstand repeated use.

It is against this background that the invention was devised.

SUMMARY OF THE INVENTION

Single Part Hinge

A single part hinge is provided. The single part hinge comprises: a first portion and a second portion; a flexural arrangement, connecting a first end of the first portion to a first end of the second portion; wherein the single part hinge is rotationally movable about a pivot point at the first end of the first portion, and moveable between a first position and a second position, wherein in the first position, rotation is limited by a first support region and in the second position, rotation is limited by a second support region.

The first portion and the second portion may be compared with leaves of a typical hinge.

A flexure is a flexible element or combination of elements engineered to be compliant in specific degrees of freedom. Typically, flexures comprise a thin bar, sheet or cut-out of material which may more easily bend compared with the surrounding material. The specific design enables complex motion profiles with specific degrees of freedom and distance of travel.

The flexural arrangement may be considered to be the pivot axis or the point of the hinge, although the 'axis' may not be spatially fixed relative to the first portion and the second portion.

In some arrangements, the single part hinge may have a substantially columnar 'leg'-shape for supporting weight as well as movement. If the single part hinge is considered to be a leg then the first portion may be a 'shank' (between the knee and the ankle) where the front of the shank is a 'shin' and ends in a 'heel', the second portion may be a 'foot' and the flexural arrangement may be an 'ankle'.

The single part hinge is arranged to move between two positions. In the first position, the leg or heel rests back on the ankle or first support region, and in the second position the leg rests forwards with the shin on the top of the foot or second support region. The load carried by the hinge passes through the first support region (heel) in the first position, and the second support region (shin on top of the foot) in the second position. In this way, forces carried by the leg are supported in both the first position and the second position by the first support region and the second support region. The flexural arrangement carries minimal or substantially no load compared with the support regions, while the first portion and the second portion carry substantially all of the load carried through the single part hinge.

Thus, the support regions may enable the first portion and the second portion to be structural elements. The support regions may enable the single part hinge to move between the first position and the second position with minimal force as only minimal force is carried by the flexural arrangement, and therefore there are substantially no forces to overcome to move the flexural arrangement between positions.

It will be appreciated that as the hinge is a single part, the number of parts required may be reduced.

Typically, a hinge requires two leaves that extend laterally from their knuckle(s). The knuckles extending from each leaf alternate and interlock with a pin passing through them. Thus, typically a hinge comprises a plurality of parts, e.g. 8 parts comprising separate leaves, a pin and a plurality of bearings. The reduction in the number of parts, down to 1, may mean that assembly time is reduced. Further, there is no requirement to have good tolerances between the parts, nor for lubrication to be applied between parts. Accordingly, the associated costs of assembling the single part hinge into a more complex arrangement may be reduced.

Further, it will be appreciated that a reduction in the number of parts may lead to a reduction in the overall weight required for the single part hinge. For example, it may be possible to topology optimise the single part hinge.

The interface between the first portion and the second portion at the first support region may have complimentary shape.

In other words, at the first support region, the first end of the first portion is paired with the first end of the second portion in order that they meet or abut in agreement to fit or fix together. In some cases, the pieces may be manufactured together with a perforation between them to ensure that the shapes are well matched. The perforation may then be broken when ready to use.

The juncture between the first portion and the second portion, at the first support region, may be at least partially castellated. Castellation may help to reduce any lateral or torsional forces on the flexural arrangement. Further, castellation may help to ensure that the leg seats properly on the ankle when moving into the first position.

As noted above, the load is substantially taken through the first and second support regions, rather than the flexure arrangement itself. Having a complimentary shape between the parts where the first portion and the second portion meet, may mean that forces are transferred more directly and may mean that forces are spread across the region.

The shape of the second portion guides the first portion to the first position.

In this way, as the single part hinge moves to the first position it may be ensured that the first portion and the second portion come together substantially correctly and as intended. Such guidance, provided by the shape, may further reduce the risk of lateral or torsional forces, thereby providing at least some protection to the flexural arrangement.

Another advantage may be that the guidance ensures smooth and uniform action of the single part hinge as the hinge moves between positions.

Further, at least a portion of the juncture or interface between the first portion and the second portion may be curved. Again, this may ensure a smooth and uniform action of the single part hinge as the hinge moves between positions.

The single part hinge may be at least partially supported by the first support region at substantially all positions between the first position and the second position. In this way, the hinge is substantially supported throughout its use.

The first support region of the section portion has a shark-tooth shape.

A shark-tooth shape is curved in the same direction on both the leading edge and the trailing edge. The leading edge and the trailing edge meet at a point.

In the first position, the point of the 'tooth' projects from the first end of the second portion into a recess of first end of the first portion. In the second position, the end of the first portion rocks forwards and the point of the 'tooth' remains in contact with the recess, although not fully seated in the recess. Thus, in the second position load may be distributed between the first support region and the second support region, where, at the first support region, there is partial contact between the first portion and the second portion.

The interface between the first portion and the second portion at the second support region have complimentary shape.

Similarly to the heel or first support region, the bottom of the shin may be paired with the top of the foot to meet or abut in agreement.

In some arrangements, the bottom of the shin and the top of the foot may be substantially flat or planar. As the second support region may be distal to the flexural arrangement, there may be substantially less need to guard against lateral or torsional forces on the flexural arrangement.

Having a substantially flat interface may mean that force is more evenly distributed across the surface, that it is easier to manufacture, and that there are less likely to be tolerance issues.

The flexural arrangement is at least partially bounded on the lateral sides by the first support region.

It will be appreciated that the flexural arrangement may be delicate or fragile compared with the first and second portion as it is required to bend, according to specifically designed degrees of freedom.

The end of the first portion may extend downwards towards the second portion on either side of the flexural arrangement, thereby bounding or flanking the flexural arrangement. The first portion may meet the second portion. In this way, advantageously, forces carried by the first portion may be transferred directly to the second portion, effectively by-passing the flexural arrangement in the first support region.

The flexure arrangement is at least partially nested within the first end of the first portion. The flexure arrangement is at least partially nested within the first end of the second portion.

In other words the flexure arrangement may be housed or enclosed between the first portion and the second portion. Advantageously, the flexural arrangement may be substantially enclosed by the first portion on 4 sides, and the second portion on 2 sides. Thus, the flexural armament may be substantially protected by the first portion and the second portion.

It will be appreciated that the first support region comprises parts of the first portion and the second portion, where the first portion and the second portion meet.

The first portion comprises a rocker at the first end of the first portion and the second portion comprises a socket, where the rocker is located within the socket.

A rocker and socket arrangement between the first portion and the second portion may ensure that the end of the first portion is 'self-locating' in the second portion. In other words, the first portion may comprise a ball end, and the second portion may comprise a cup. Advantageously, there may be a smooth movement between the first position and the second position. Advantageously, there may be low friction between the rocker and the socket.

The flexural arrangement comprises one or more strip(s) of material extending between the first portion and the second portion.

As noted above, a flexure typically comprises a thin bar, sheet or cut-out of material which may more easily bend compared with the surrounding material. The flexural arrangement may comprise one or more flexure components. The flexure components may be strips or ribbons of material. The strip(s) of material may have a relatively long longitudinal or length dimension, a short depth or thickness dimension and middling width dimension to enable bending in forward and back directions. The flexure may be a blade-type flexure. A first end of each strip may be attached to the first portion, and the distal end of each strip may be attached to the second portion.

At least one strip extends in a first direction, and at least one strip extends in a second direction substantially opposed to the first direction.

The flexural arrangement may comprise two or more strips. One or more first strip(s) extending in a forward direction, i.e. in the direction of movement from the first position of the hinge to the second position of the hinge, and one or more second strip(s) extending in a reverse or backwards direction i.e. in a direction of movement from the second position of the hinge to the first position of the hinge.

In this way, the two or more strips may form an 'X'. The middle point of the 'X' may be the pivot point of the single part hinge. The middle point of the flexure arrangement may be arranged to coincide with one or more edges of the bounding first support region. In this way, the flexure arrangement is substantially supported by the first support region throughout its movement between the first position and the second position of the single part hinge.

By having flexure strips extending in the first and second directions, movement of the single part hinge may be controlled in both directions of movement, forward and in reverse.

The flexural arrangement comprises a single strip extending in a first direction, and two strips extending in a second direction, and the strip extending in the first direction has a width equal to the combined width of the two strips extending in the second direction.

It will be appreciated that adjusting the width of the strip(s) in the first direction, compared with the strip(s) in the second direction it is possible to correspondingly adjust the force required to move the single part hinge in the first or forward and second or reverse directions. Accordingly, it is possible to design a single part hinge which requires more force to move in one direction compared with the reverse direction. Thus, the hinge could be biased towards one direction. Alternatively, it will be appreciated that where the total width of the strips in the first direction is matched by the total width of the strips in the second direction, the single part hinge will be substantially balanced, requiring approximately equal force to move in either direction.

Each strip of the flexural arrangement is separated from other features by a gap each side along its length.

In this way, each strip may be free to move without being encumbered by other parts of the single part hinge. It will be appreciated that, as a result of the gap between the strip(s) and other components, there is little or substantially no friction to move the single part hinge between the first position and the second position, or vice versa. It follows that a smaller force is required to move the single part hinge between positions. Where the hinge is operated by a motor, a smaller motor may be employed thereby representing a cost saving in capital and energy.

This freedom of movement may be in contrast to conventional or typical hinges, bearings or slides which often exhibit positioning hysteresis due to backlash and or friction. Accordingly, the single part hinge may be moveable to position with high prevision.

The first portion, the second portion and the flexural arrangement are formed from a single piece of material.

It will be appreciated that the single part hinge is made from a single, continuous piece of material. Typically, the material will be selected for displaying suitable elastic, flexibility vs. stiffness, resilience and fatigue properties. It will be appreciated that some material properties are dependent on the mode of manufacture. It will be appreciated that some material properties are anisotropic. Suitable materials may be: plastic, polymer plastics, thermoset plastic, thermoplastic plastic, metals, aluminium, aluminium alloy, iron, iron alloy, steel, steel alloy, magnesium, magnesium alloy, titanium, titanium alloy, zinc, zinc alloy, fibre reinforced composite, carbon fibre, graphite fibre, glass fibre, natural fibre, plant fibre, plastic fibre, paper, cardboard, rubber, epoxy OR nylon.

The single part mechanism is 3D printed, or constructed by additive manufacturing.

Often it is possible to manufacture more complex shapes by employing additive or 3D printing. It will be appreciated, that the additive process may result in anisotropic material properties. Using some additive manufacturing methods it is possible to employ more than one material, and grade the transition between materials. These methods are anticipated.

The first portion further comprises a window for removal of excess material.

It will be appreciated that some additive manufacturing methods employ sintering a powder material. Excess powder that needs to be removed may be left on the product once the sintering process is complete. It will be appreciated that excess powder which is located between sections of the single part hinge may be difficult to remove.

The window may be located on the back face of the heel. The window may have a letter box shape profile. More than one window may be employed.

It will be appreciated that the window may advantageously be used to assist the removal of excess material.

Further, it will be appreciated that the window may be used to inspect the interior parts of the single part hinge.

Uses

The single part mechanism may be used as a linkage set for transferring horizontal force to vertical movement.

The linkage set may comprise a direction-change mechanism.

A second single part hinge is formed at a second end of the first portion, distal from the first end of the first portion, forming a double single part hinge linkage.

A load-handling device for lifting and moving storage containers stacked in a grid framework structure may comprise: a first set of parallel rails or tracks and a second set of parallel rails or tracks extending substantially perpendicularly to the first set of rails or tracks in a substantially horizontal plane to form a grid pattern comprising a plurality of grid spaces, wherein the grid is supported by a set of uprights to form a plurality of vertical storage locations beneath the grid for containers to be stacked between and be guided by the uprights in a vertical direction through the plurality of grid spaces, the load handling device comprising: a body mounted on a first set of wheels being arranged to engage with the first set of parallel tracks and a second set of wheels being arranged to engage with the second set of parallel tracks, and a direction-change assembly arranged to raise or lower the first set of wheels, and or lower or raise the second set of wheels with respect to the body to engage and disengage the wheels with the parallel tracks, wherein the direction-change assembly comprises a linkage-set comprising a series of single part hinges arranged between a traveller and a fixed brace, wherein the traveller is arranged to move under an applied force to enable the wheels to raise or lower.

These are some examples of uses of a single part hinge.

It will be appreciated that the single part hinge may be employed as part of a number of different linkage mechanisms. It will be appreciated that more than one single part hinge may be incorporated into a piece to create a complex mechanism.

Manufacture

A method of manufacturing a single part hinge is provided. The method comprises the steps of: printing a digital model of the single part hinge using an additive manufacturing apparatus; removing the printed single part hinge from additive manufacturing apparatus; and removing excess material from the single part hinge.

As noted above, the single part hinge may be manufactured by 3D printing or additive manufacturing. In particular, selective laser sintering (SLS) 3D printing may be used. SLS methods may be particularly advantageous for printing the disclosed single part hinge because during the printing process the part under construction is supported by unsintered powdered material throughout the process. This allows for geometries to be constructed that would not be possible using some other techniques. For example, using SLS techniques it is possible to fabricate elements which are 'nested'. Alternatively, Multi Jet Fusion (MJF) 3D printing is another powder base technique where an inject array applies fusing and detailing agents which are then combined by heating to create a solid layer. It will be appreciated that any suitable additive manufacturing techniques or apparatus may be used and that the present disclosure is not limited to the techniques mentioned herein.

It will be appreciated, that additive manufacturing methods typically fabricate or build pieces according to 'sliced' layers. It will be appreciated, that the direction of 'slicing' may impact the material behaviour of the finished piece. Accordingly, a direction of fabrication may be specified to ensure the intended properties for the piece result at the end of the process. This may be particularly important for the single part hinge disclosed herein as the flexural arrangement is required to flex in a particular direction.

In the case of the single part hinge disclosed herein, it will be appreciated that after fabrication in the build chamber it may be necessary to remove excess material, particularly if a powder technique is used. Removal of excess material may be performed manually or in an automated, or semi-automated process. Other post-processing steps may optionally be performed.

As noted above, the window or letter box feature on the heel of the single part hinge, may be used to assist removal of excess powder. The window may also be used to inspect the internal parts i.e. the flexural arrangement of the hinge to ensure that the parts are properly arranged.

In an automated cleaning process, the printed parts may be placed in a tumbling machine to shake excess material from the printed part. It will be appreciated that the parts may be subjected to forces which are not present during normal use of the part. For the single part hinge, during the cleaning process, the castellation feature may assist in protecting more delicate features such the flexural arrangement.

The single part hinge may then be ready for assembly into more complex mechanisms.

As mentioned above, the interface between the first portion and the second portion may have complimentary shape. Using additive manufacturing techniques the single part hinge may be designed with the first portion and the second portion joined with a thin piece of material between the parts. After manufacture, the interface may be split apart to allow movement between the first portion and the second portion. In this way, the interface between the first portion and the second portion may be complimentary, regardless of any distortions or changes in shape resulting from the manufacturing process. In other orders, regardless of manufacturing tolerance the first portion and the second portion will have substantially complementary shape. Advantageously, this may that fewer printed parts are rejected.

Following the example discussed herein, the single part hinge may be assembled into a linkage-set for a direction change mechanism.

A set or series of single part hinges may be attached to an upper brace by slotting each single part hinge onto a corresponding shaft extending from the upper brace. Similarly each single part hinge may be slotted onto a corresponding shaft extending from a lower brace. A cap plate may then be attached to secure the parts together. In this way, a linkage set may be quickly and easily assembled, having fewer parts and simple processes to put together. Four linkage sets may be assembled, one for each side of a load handling device as a direction-change assembly. It will be appreciated, that a reduction in assembly time for a direction-change assembly is a multiple of the reduction of assembly time for each linkage-set. Accordingly, significant savings may be enabled by the single part hinge.

Other variations and advantages will become apparent from the following description.

BRIEF DESCRIPTION OF THE DRAWINGS

These and other aspects of the invention will now be described, by way of example only, and with reference to the accompanying drawings, in which:

FIG. 8a is an isometric view of a cross-section cut through the flexural arrangement, FIG. 8b is the XY plane view cut through the flexural arrangement, FIG. 8c is a view of the single part hinge in the ZY plane, and FIG. 8d is a view of the hinge in the ZX plane;

FIG. 9a is a view in the ZY plane, and FIG. 9b is a view in the ZX plane;

FIG. 10a is a view of the hinge in the ZX plane, and FIG. 10b is a cross-section view;

FIG. 11a is a view of the hinge in the ZY plane and FIGS. 11b-d are detailed views of a cross-section view, where FIG. 11b is in the raised position, FIG. 11c is in the park position, and FIG. 11d is in the lowered position;

FIG. 12a is at rest and FIG. 12b is flexed;

FIG. 13a is a view of the hinge in the ZX plane, FIG. 13b is an isometric view of a cross-section, and FIG. 13c is a YX view of the cross-section;

FIG. 14a is an isometric view and FIG. 14b is the ZY plane;

FIG. 15 illustrates an arrangement using two single part hinges, where FIG. 15f is an isometric front view, FIG. 15g is an isometric rear view, FIG. 15h is XY bottom view and FIG. 15i is a ZY cross-section view.

In the figures, like features are denoted by like reference signs where appropriate.

DETAILED DESCRIPTION

The following embodiments represent preferred examples of how the invention may be practiced, but they are not necessarily the only examples of how this could be achieved. These examples are described in sufficient detail to enable those skilled in the art to practice the invention. Other examples may be utilised and structural changes may be made without departing from the scope of the invention as defined in the appended claims. Moreover, direction references and any other terms having an implied orientation are given by way of example to aid the reader's understanding of the particular examples described herein. They should not be read to be requirements or limitations, particularly as to the position, orientation, or use of the invention unless specifically set forth in the appended claims. Similarly, connection references (e.g., attached, coupled, connected, joined, secured, and the like) are to be construed broadly and may include intermediate members between a connection of elements and relative movement between elements. As such, connection references do not necessarily infer that two elements are directly connected and in fixed relation to each other, unless specifically set forth in the appended claims. Similarly, wording such as "movement in the n-direction" and any comparable wording, where n is one of x, y or z, is intended to mean movement substantially along or parallel to the n-axis, in either direction (i.e., towards the positive end of the n-axis or towards the negative end of the n-axis).

Figure 1:
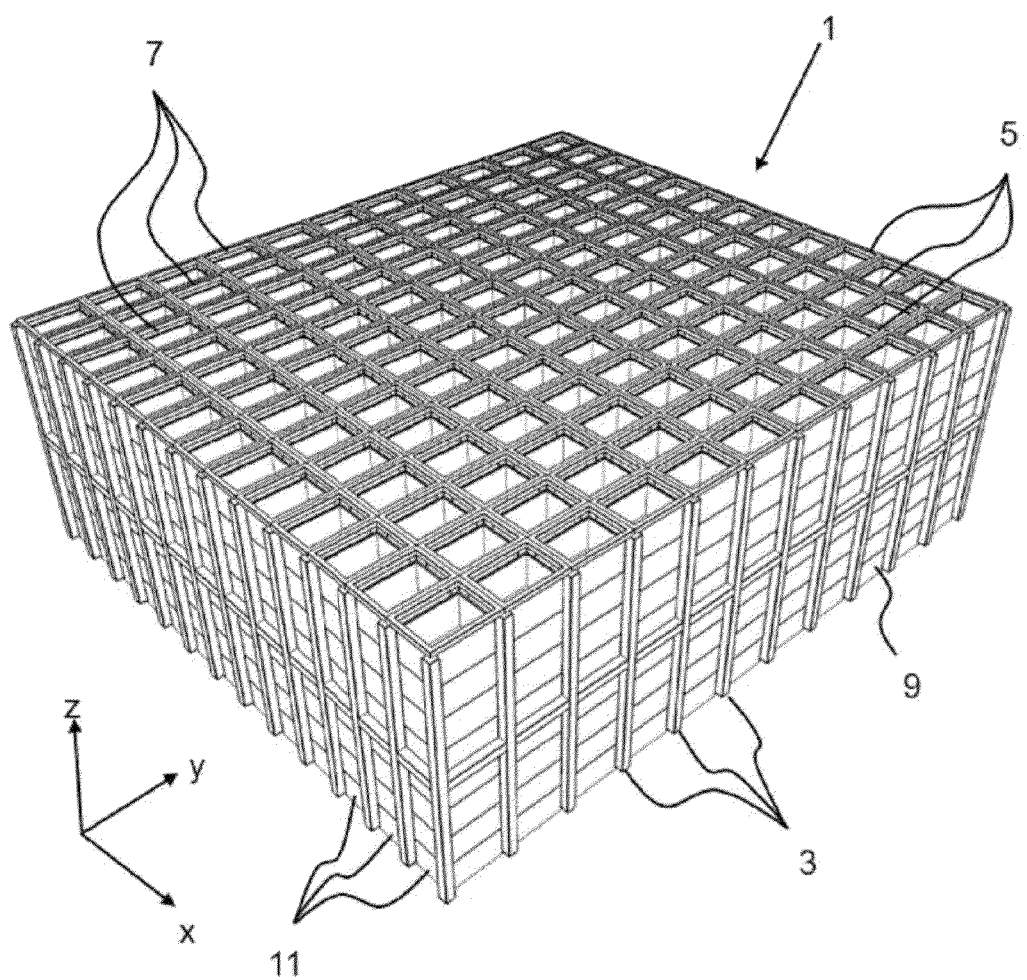
FIG. 1 illustrates a storage structure.

FIG. 1 illustrates a storage structure 1 comprising upright members 3 and horizontal members 5, 7 which are supported by the upright members 3. The horizontal members 7 extend parallel to one another and the illustrated x-axis, whereas the horizontal members 5 extend parallel to one another and the illustrated y-axis, transversely to the horizontal members 7. The upright members 3 extend parallel to one another and the illustrated z-axis. The horizontal members 5, 7 form a grid pattern defining a plurality of grid cells. In the illustrated example, containers 9 are arranged in stacks 11 beneath the grid cells defined by the grid pattern, with one stack 11 of containers 9 per grid cell.

Figure 2:
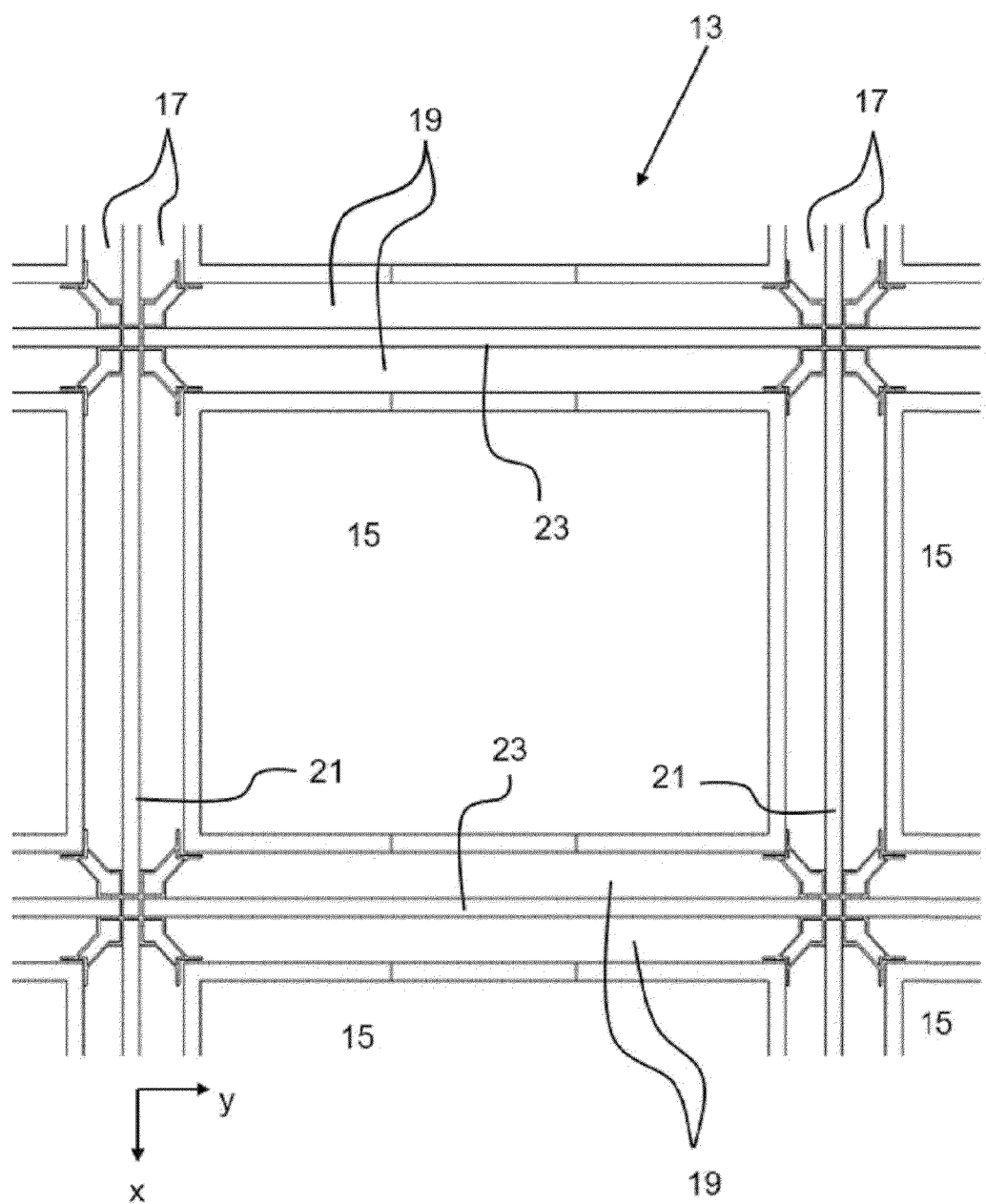
FIG. 2 illustrates a track structure.

FIG. 2 shows a large-scale plan view of a section of a track structure 13, located on top of the horizontal members 5, 7 and forming part of the storage structure 1 illustrated in FIG. 1. The track structure 13 may be provided by the horizontal members 5, 7 themselves (e.g., formed in or on the surfaces of the horizontal members 5, 7) or by one or more additional components mounted on top of the horizontal members 5, 7. The illustrated track structure 13 comprises x-direction tracks 17 and y-direction tracks 19. In this case, a first set of tracks 17 extend in the x-direction and a second set of tracks 19 extend in the y-direction, transverse to the first set of tracks 17. The tracks 17, 19 define apertures 15 at the centres of the grid cells. The apertures 15 are sized to allow containers 9 located beneath the grid cells to be lifted and lowered through the apertures 15. The first set of tracks 17 are provided in pairs separated by ridges 21, and the second set of tracks 19 are provided in pairs separated by ridges 23. Other arrangements of track structure may also be possible.

Figure 3:
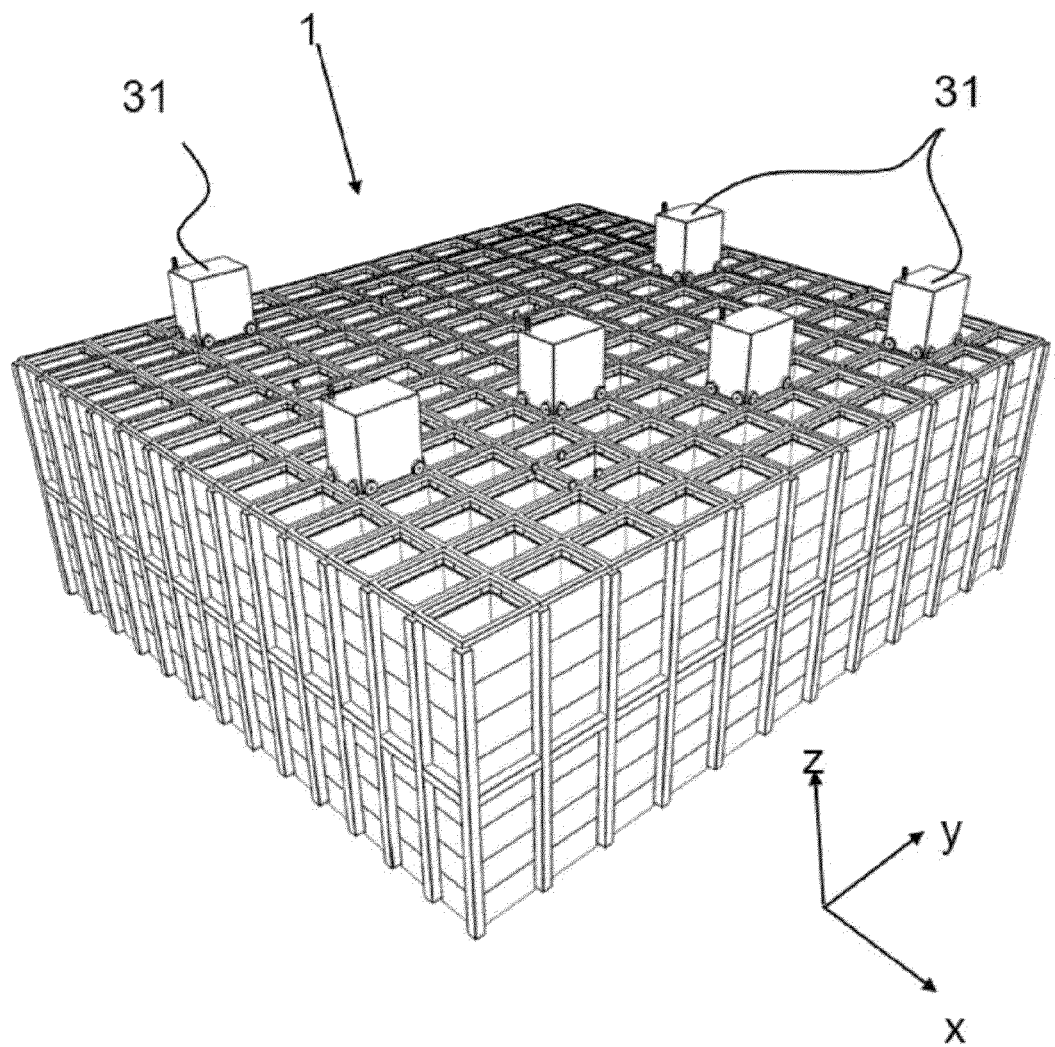
FIG. 3 illustrates robotic load-handling devices on top of the storage structure illustrated in FIG. 1.

FIG. 3 shows a plurality of robotic load-handling devices 31 moving on top of the storage structure 1 illustrated in FIG. 1. Each load-handling device 31, which may also be referred to as a robot 31 or bot 31, is provided with a direction-change assembly (not shown) and sets of wheels to engage with corresponding x- or y-direction tracks 17, 19 to enable the bot 31 to travel across the track structure 13 and reach specific grid cells. As mentioned, the sets of tracks 17, 19 are separated by ridges 21, 23 allowing a pair of bots 31 to occupy neighbouring grid cells or pass one another without colliding.

Figure 4:
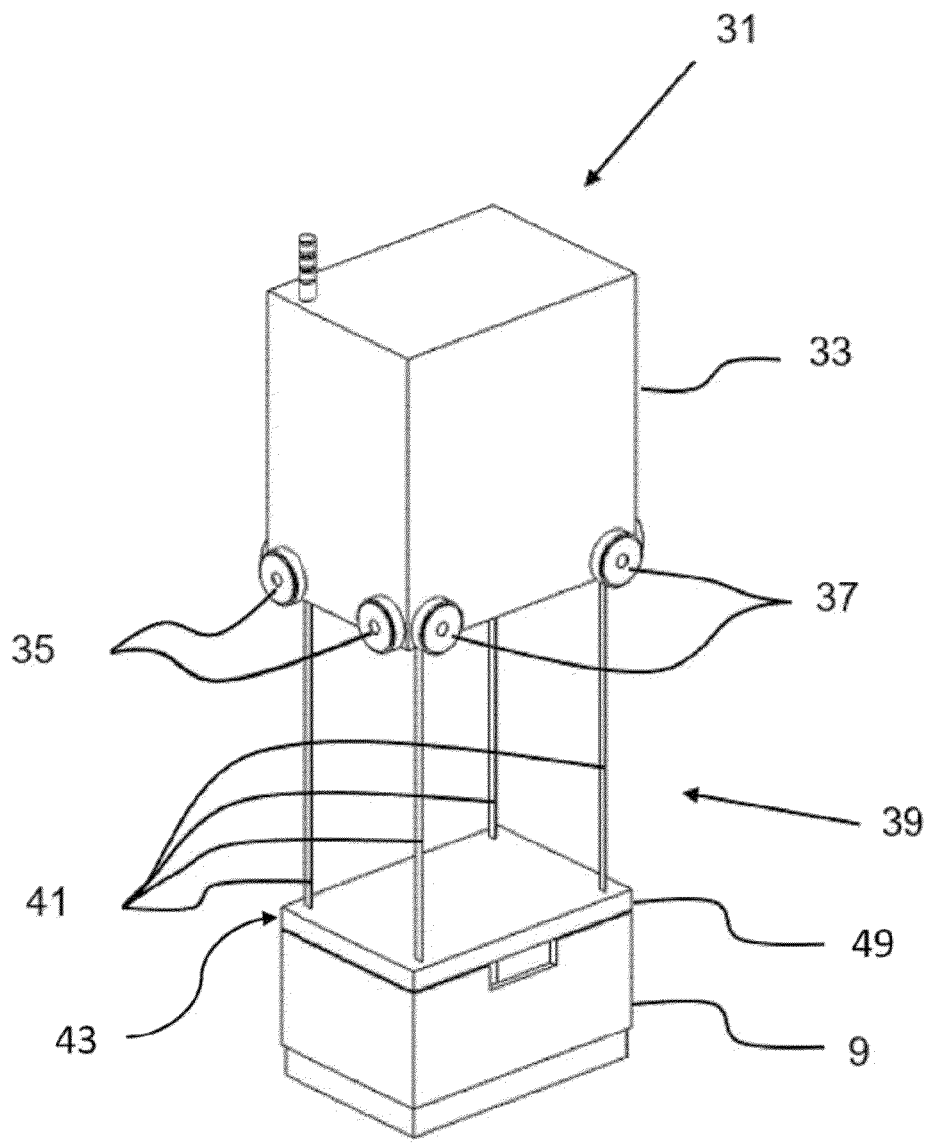
FIG. 4 illustrates a robotic load-handling device or bot.

As illustrated in detail in FIG. 4, a bot 31 comprises a body 33 in or on which are mounted one or more components which enable the bot 31 to perform its intended functions. These functions may include moving across the storage structure 1 on the track structure 13, and lowering or raising containers 9 to or from the stacks 11 so that the bot 31 can deposit or retrieve containers 9 in specific locations defined by the grid pattern.

In order to perform the former function, the bot 31 comprises first and second sets of wheels 35, 37, which are mounted on the body 33 and enable the bot 31 to move in the x- and y-directions along the tracks 17 and 19, respectively. In particular, two wheels 35 are provided on the shorter side of the bot 31 visible in FIG. 4, and a further two wheels 35 are provided on the opposite shorter side 36 of the bot 31. The wheels 35 are rotatably mounted on the body 33 and are configured to engage with tracks 17 to allow the bot 31 to move along the tracks 17. Analogously, two wheels 37 are provided on the longer side of the bot 31 visible in FIG. 4, and a further two wheels 37 are provided on the opposite longer side 38 of the bot 31. The wheels 37 engage with tracks 19 and are rotatably mounted on the body 33 of the bot 31 to allow the bot 31 to move along the tracks 19.

To enable the bot 31 to move on the different wheels 35, 37 in the first and second directions, the bot 31 includes a wheel-positioning mechanism for selectively engaging either the first set of wheels 35 with the first set of tracks 17 or the second set of wheels 37 with the second set of tracks 19. The wheel-positioning mechanism is configured to raise and lower the first set of wheels 35 and/or the second set of wheels 37 relative to the body 33, thereby enabling the load-handling device 31 to selectively move in either the first direction or the second direction across the tracks 17, 19 of the storage structure 1.

The wheel-positioning mechanism may include one or more linear actuators, rotary components or other means for raising and lowering at least one set of wheels 35, 37 relative to the body 33 of the bot 31 to bring the at least one set of wheels 35, 37 out of and into contact with the tracks 17, 19. In some examples, only one set of wheels is configured to be raised and lowered, and the act of lowering the one set of wheels may effectively lift the other set of wheels clear of the corresponding tracks while the act of raising the one set of wheels may effectively lower the other set of wheels into contact with the corresponding tracks. In other examples, both sets of wheels may be raised and lowered, advantageously meaning that the body 33 of the bot 31 stays substantially at the same height and therefore the weight of the body 33 and the components mounted thereon does not need to be lifted and lowered by the wheel-positioning mechanism.

In furtherance of the latter function, the bot 31 further comprises container-lifting means, generally designated by 39, configured to raise a container 9 from a stack 11 into a container-receiving space or cavity of the bot 31, and lower a container 9 from the container-receiving space onto a stack 11. The illustrated container-lifting means 39 comprises four tapes or reels 41 which are connected at their lower ends to a container-engaging assembly 43. The tapes 41 may be wound up or down to raise or lower the container-engaging assembly 43, as required. One or more motors or other means may be provided to effect or control the winding up or down of the tapes 41.

Figure 5:
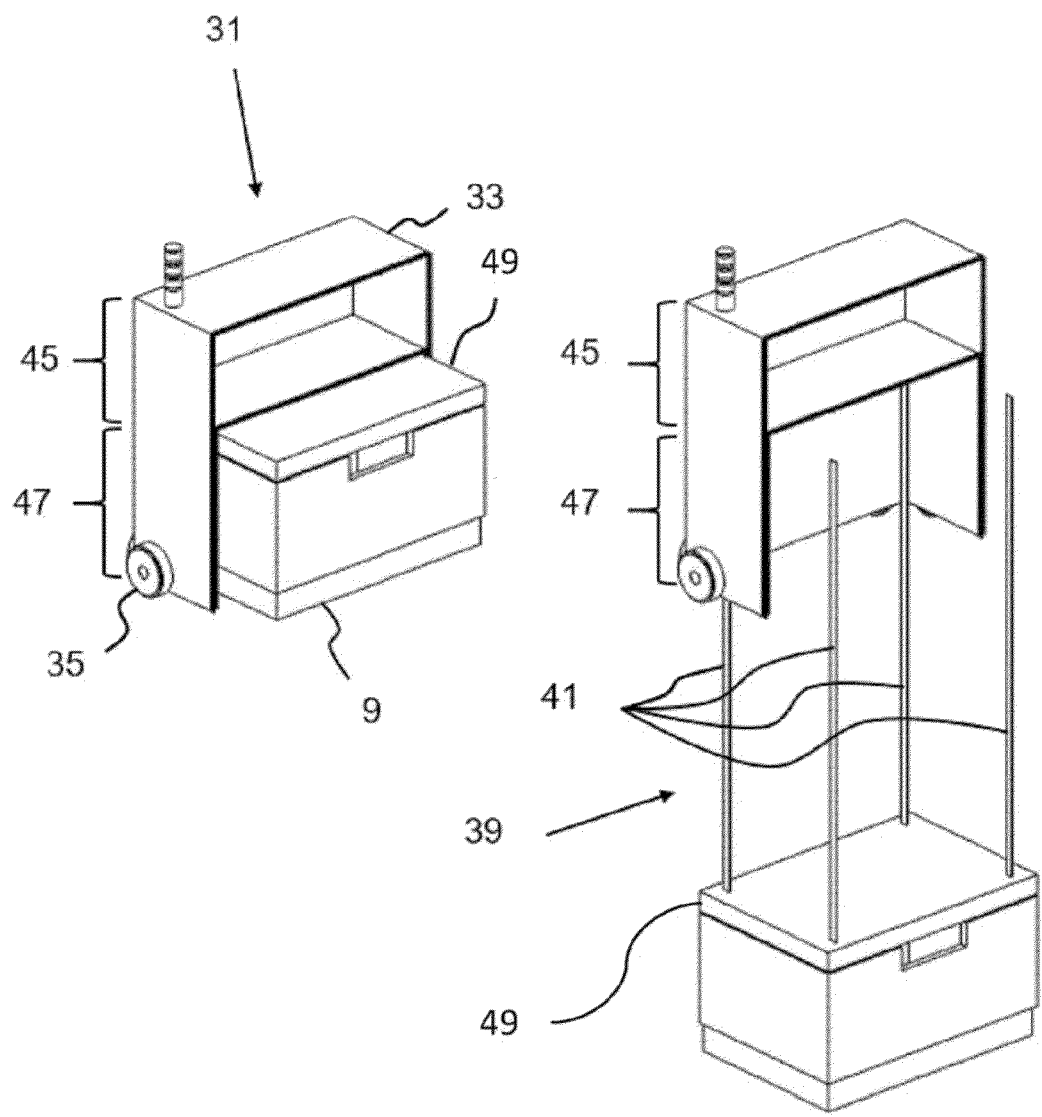
FIG. 5 illustrates a robotic load-handling device or bot.

As can be seen in FIG. 5, the body 33 of the illustrated bot 31 has an upper portion 45 and a lower portion 47. The upper portion 45 is configured to house one or more operation components (not shown). The lower portion 47 is arranged beneath the upper portion 45 and comprises a container-receiving space or cavity for accommodating at least part of a container 9 that has been raised by the container-lifting means 39. The container-receiving space is sized such that enough of a container 9 can fit inside the cavity to enable the bot 31 to move across the track structure 13 on top of storage structure 1 without the underside of the container 9 catching on the track structure 13 or another part of the storage structure 1. When the bot 31 has reached its intended destination, the container-lifting means 39 controls the tapes 41 to lower the container-engaging assembly 43 and the corresponding container 9 out of the cavity in the lower portion 47 and into the intended position. The intended position may be a stack 11 of containers 9 or an egress point of the storage structure 1 (or an ingress point of the storage structure 1 if the bot 31 has moved to collect a container 9 for storage in the storage structure 1). Although in the illustrated example the upper and lower portions 45, 47 are separated by a physical divider, in other embodiments, the upper and lower portions 45, 47 may not be physically divided by a specific component or part of the body 33 of the bot 31.

In some embodiments, the container-receiving space of the bot 31 may not be within the body 33 of the bot 31. For example, in some embodiments, the container-receiving space may be adjacent to the body 33 of the bot 31 (e.g., in a cantilever arrangement with the weight of the body 33 of the bot 31 counterbalancing the weight of the container to be lifted). In such embodiments, a frame or arms of the container-lifting means 39 may protrude horizontally from the body 33 of the bot 31, and the tapes/reels 41 may be arranged at respective locations on the protruding frame and configured to be raised and lowered from those locations to raise and lower a container into the container-receiving space adjacent to the body 33. The height at which the frame is mounted on and protrudes from the body 33 of the bot 31 may be chosen to provide a desired effect. For example, it may be preferable for the frame to protrude at a high level on the body 33 of the bot 31 to allow a comparatively larger container or a plurality of containers to be raised into the container-receiving space beneath the frame. Alternatively, the frame may be arranged to protrude lower down the body 33 (but still high enough to accommodate at least one container between the frame and the track structure 13) to keep the centre of mass of the bot 31 lower when the bot 31 is loaded with a container.

In the embodiment shown, the container-engaging assembly 43 comprises a gripper plate 49 attached to the lower ends of the tapes 41 and one or more gripper assemblies (not shown) mounted thereon for latching to a container 9. The gripper assemblies, which may, for example, be provided at the corners of the gripper plate 49, in the vicinity of the tapes 41, are arranged to align with recesses or openings in the containers 9 and interact therewith when activated in order to latch to the containers 9.

Figure 6:
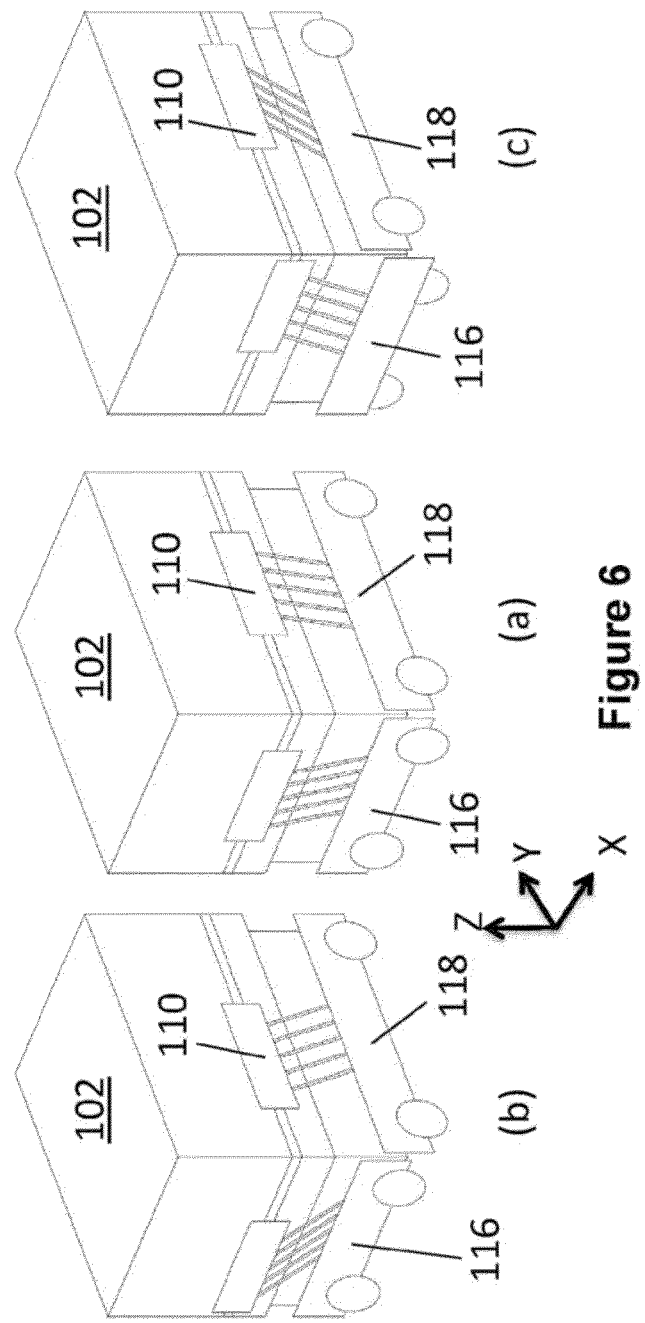
FIG. 6 illustrates a load handling device and a direction-change assembly, where in FIG. 6a the load handling device is parked, in FIG. 6b the x-direction wheels are raised while the y-direction wheels are lowered for movement in the y-direction, and in FIG. 6c the y-direction wheels are raised while the x-direction wheels are lowered for movement in the x-direction.

FIG. 6 illustrates a perspective view of a load handling device 102 having a direction-change assembly 110, in three positions: parked, y-direction movement and x-direction movement.

In FIG. 6a both the x-direction wheel chassis 116 and the y-direction wheel chassis 118 are down so that all the wheels would be engaged with the track if the load handling device were positioned on a grid structure as described above. In FIG. 6b, the x-direction wheel chassis 116 is raised while the y-direction wheel chassis 118 is lowered for movement in the y-direction, and in FIG. 6c the y-direction wheels chassis 118 is raised while the x-direction wheel chassis is lowered for movement in the x-direction. Each of the wheel chassis 116, 118 are moved vertically by connection to the direction-change assembly 110 as will be described in more detail below. The wheel chassis 116, 118 are at the same vertical or z-direction level in the parked position.

The direction-change assembly comprises a linkage-set on each side face of the load handling device 102. In FIG. 6 a linkage-set is shown on the visible x-direction side, and a similar linkage-set is arranged on the opposing x-direction side (not shown). Similarly a linkage-set is shown on the visible y-direction side, and a similar linkage-set is arranged on the opposing y-direction side (not shown). Each linkage-set is connected to the corresponding wheel chassis 116, 118 for the particular side.

Figure 7:
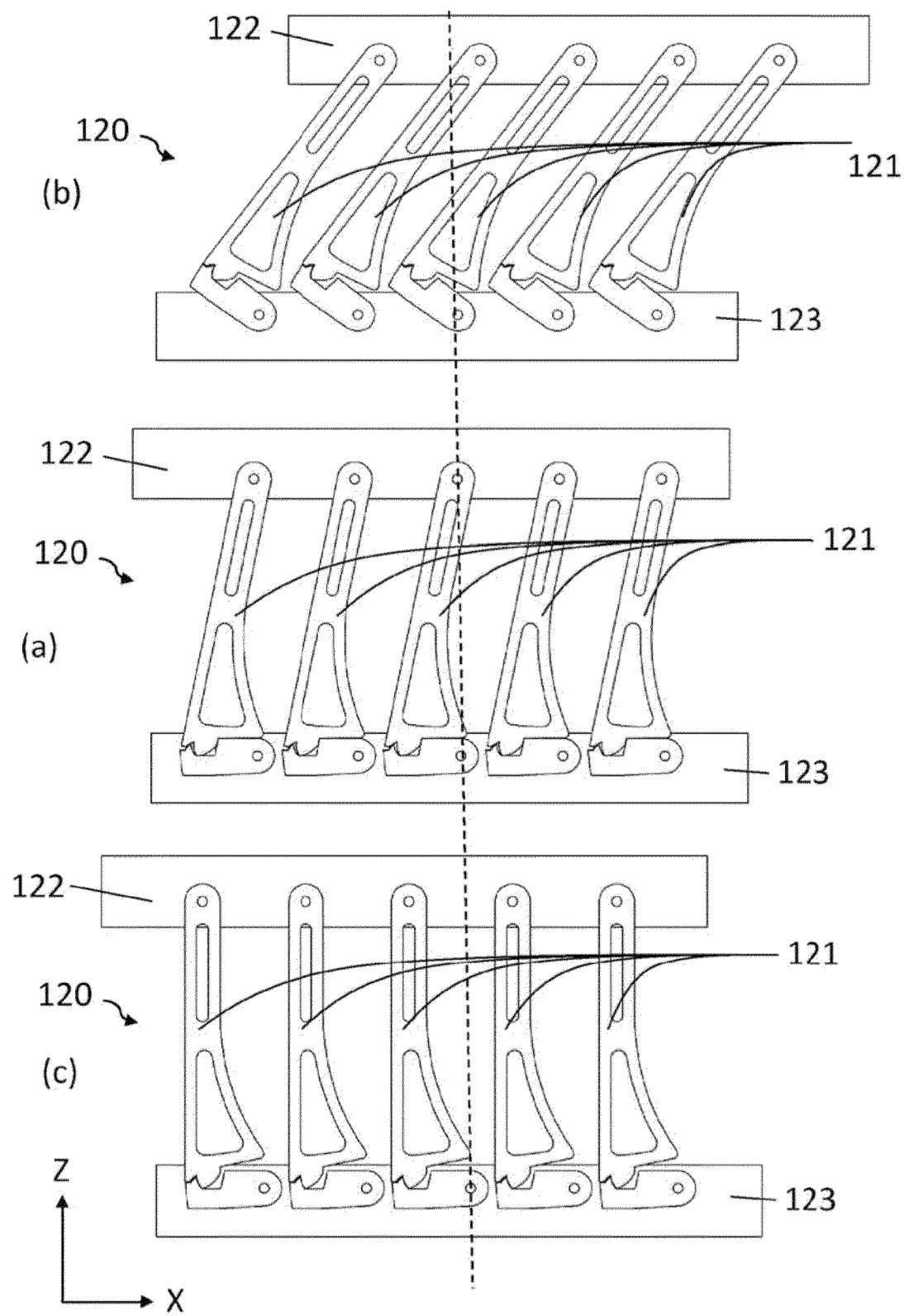
FIG. 7 illustrates a linkage-set for a direction-change assembly, where in FIG. 7a the linkage-set is in a parked position, in FIG. 7b the wheel chassis is raised for movement in the transverse direction, and in FIG. 7c the wheel chassis is lowered for movement in the parallel direction.

FIG. 7 illustrates a linkage-set 120 for a direction-change assembly 110. The linkage-set 120 comprises a series of five similar hinges 121 pivotally connected between an upper brace or traveller 122 and a lower brace 123. On a load-handling device, the lower brace 123 would be fixedly attached to the wheel chassis. If each hinge 121 is considered to be part of a leg, the hinge 121 would be attached to the upper brace 122 at the knee, and the lower brace 123 at the toe, and the hinge rotates about the ankle. Thus, each hinge 121 extends between the traveller 122 and the lower brace 123.

In FIG. 7, a dotted line is drawn to provide reference between FIGS. 7a, 7b and 7c.

In FIG. 7a the linkage-set 120 is in a parked position. In this position, the lower part or foot of the hinge is substantially horizontal and the upper part or shank of the hinge is leaning slightly forward in the positive x-direction, as indicated on the drawing.

Compared with FIG. 7a, in FIG. 7b the upper brace 122 is moved in the positive x-direction. This necessitates the linkage-set to rotate substantially clockwise. In the position shown in FIG. 7b, the foot is rotated clockwise about the toe such that the foot is raised at the heel or hinge end, distal from the toe. The shank is rotated anti-clockwise about the ankle such that the shank is sat back on the heel and the foot and shank are substantially perpendicular, and the knee is rotated clockwise. As a result, the distance in the z-direction between the upper brace 122 and the lower brace 123 is reduced. Thereby, when the lower brace 123 is attached to a wheel chassis, the wheel chassis would be raised.

Compared with FIG. 7a, in FIG. 7c the upper brace 122 is moved in the negative x-direction. This necessitates the linkage-set to rotate substantially anti-clockwise. In the position shown in FIG. 7c, the foot remains substantially horizontal. The shank is rotated anti-clockwise about the ankle such that the shank is substantially vertical and sat back on the heel and the foot. Thus, the foot and shank are substantially perpendicular. The knee is rotated anticlockwise. As a result of the positioning, the distance in the z-direction between the upper brace 122 and the lower brace 123 is increased. Thereby, when the lower brace 123 is attached to a wheel chassis, the wheel chassis would be lowered to engage the wheels with a track for movement in the x-direction.

Rotation about the ankle in clockwise and anticlockwise directions is limited as will be described below.

Thus, the linkage-set transfers a horizontal movement to a vertical movement, and provides three vertical positions, parked or neutral, raised and lowered.

It will be appreciated that the relative lengths of the shank and foot of the hinges 120 may be adjusted to achieve a designed vertical movement.

Figure 8:
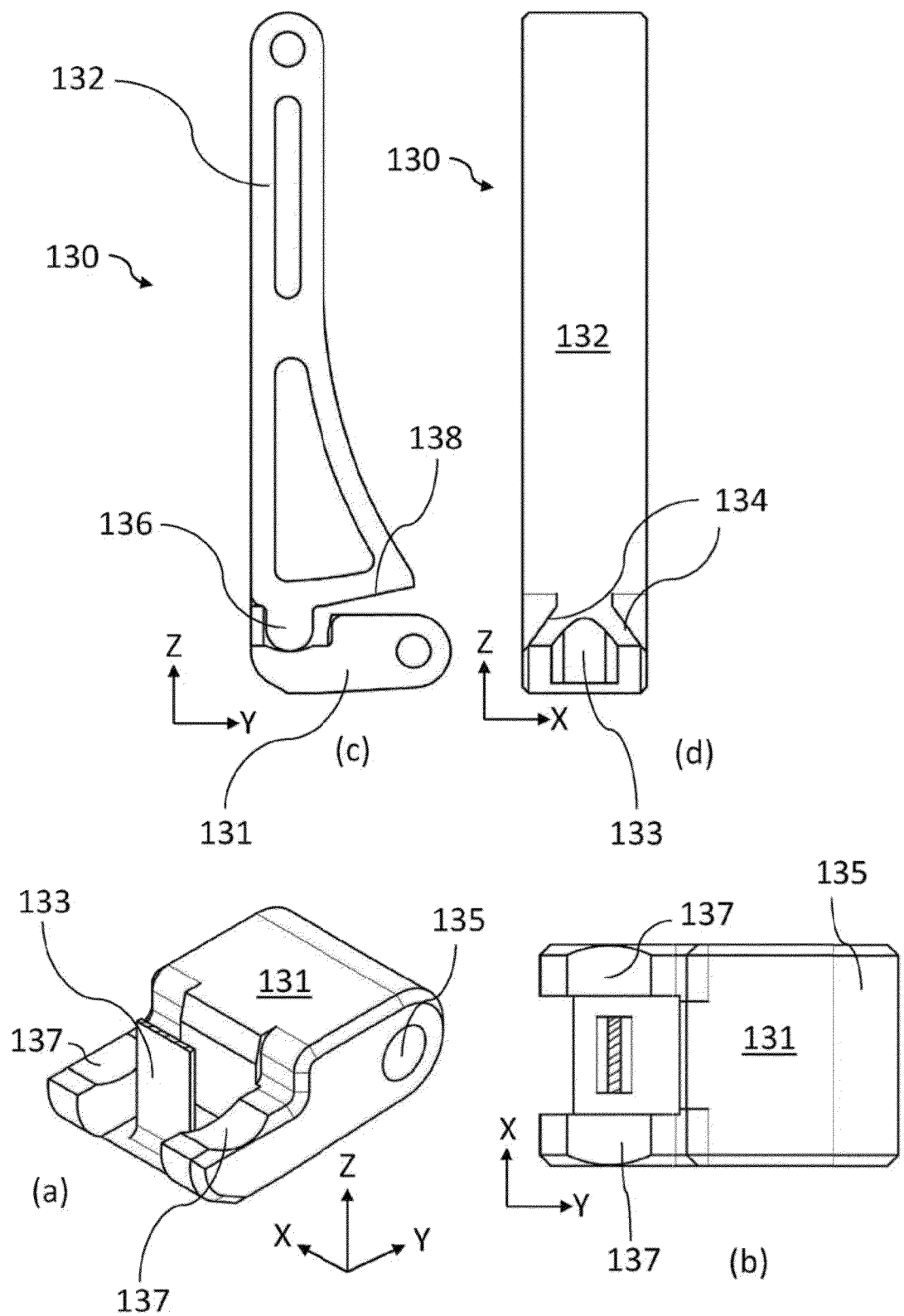
FIG. 8 illustrates a single part hinge comprising a flexural arrangement, where

FIG. 8 illustrates a single part hinge 130 comprising a flexural arrangement. FIG. 8c is a view of the single part hinge 130 in the ZY plane, and FIG. 8d is a view of the single part hinge 130 in the ZX plane. As illustrated the single part hinge 130 is in the lowered position, with the foot 131 substantially horizontal and the shank 132 substantially vertical, and perpendicular to the foot 131. A flexural arrangement 133 connects the shank 132 and the foot 131 at the ankle.

As can be seen in FIG. 8d, at the heel the shank 132 is shaped to comprise supports 134 extending to each side of the shank 132. The flexural arrangement 133 may be seen between the two branches of the support region.

FIG. 8a is an isometric view of a cross-section cut through the flexural arrangement 133 and FIG. 8b is the XY plane view cut through the flexural arrangement 133, of the foot 131. As can be seen, for this single part hinge 130 the flexural arrangement 133 is a single strip of material arranged to flex forward or clockwise towards the toe 135, and back or anti-clockwise towards the heel.

Both sides of the shank end 136 are rounded and extend down towards the foot 131 on either side of the flexural arrangement 133 and rest in a cup notch 137 of the foot 131, allowing the shank 132 to rock on the foot 131 as controlled by the flexural arrangement 133. The flexural arrangement is bounded by the shank end 136, support region 134 and the forward portion of the foot 131.

Rotation of the single part hinge 130 is limited in the anticlockwise direction by the support region 134 and the in the clockwise direction by the shank shin or front 138 resting on the top of the foot 131.

Load carried in a vertical direction through the single part hinge 130 is directed through the shank 132, and supports 134 or top of the foot 131.

Figure 9:
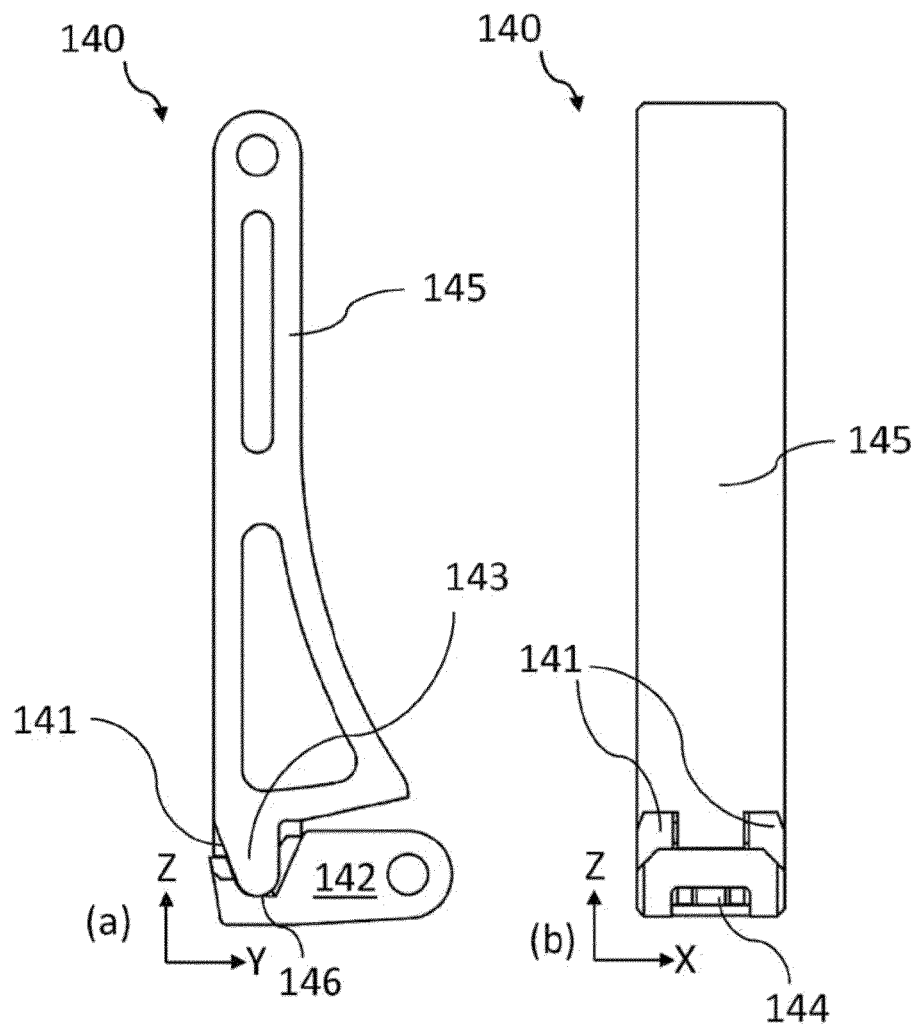
FIG. 9 illustrates another single part hinge comprising a flexural arrangement, where
Figure 10:
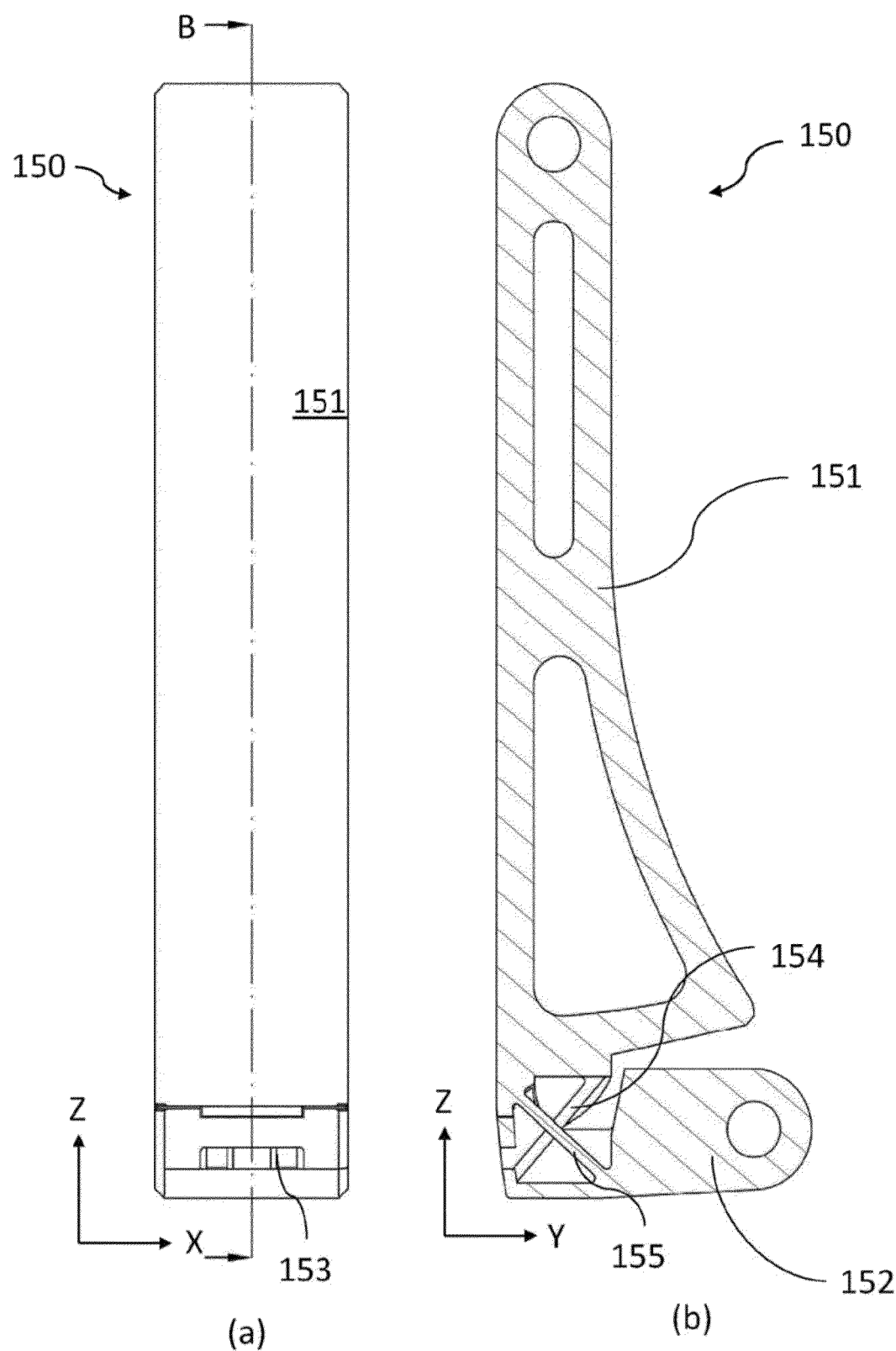
FIG. 10 illustrates another single part hinge comprising a flexural arrangement, where
Figure 11:
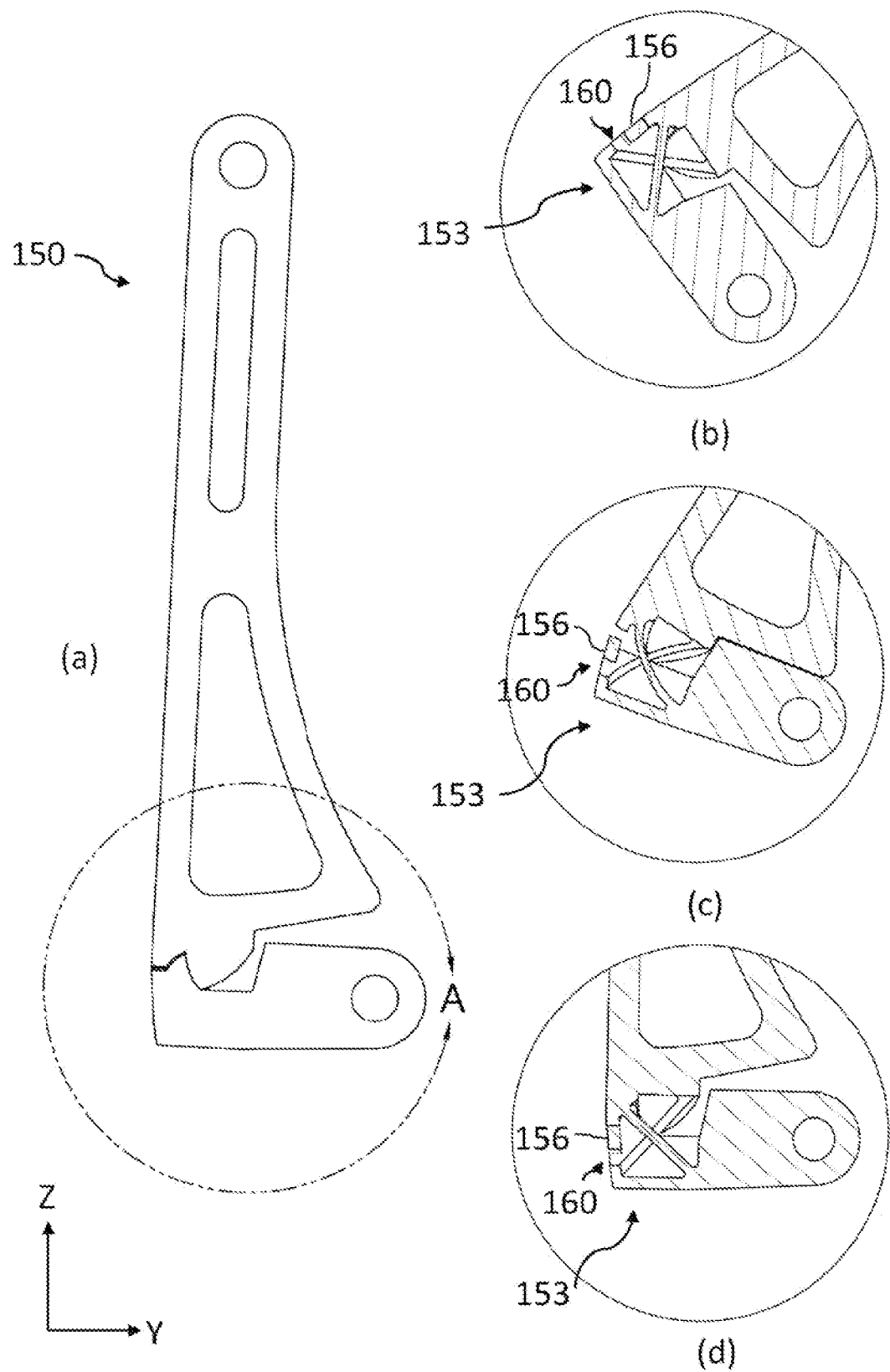
FIG. 11 illustrates the single part hinge of FIG. 10, where

FIG. 9 illustrates another single part hinge 140. FIG. 9a is a view of the single part hinge 140 in the ZY plane, and FIG. 9b is a view of the single part hinge 140 in the ZX plane. The single part hinge 140 is largely similar to the single part hinge 130 discussed in connection with FIG. 8 except for the differences described here. The supports 141 extend from the foot 142 and are angled in the anticlockwise direction along the heel edge, while the shank end rocker 143 has a complimentary shape. The socket or cup 146 of the foot 142 and the supports 141 allow a shorter angle of rotation about the ankle. As may be seen through a window in the heel, the flexural arrangement 144 has three strips of material connecting the shank 145 and the foot 142.

A third single part hinge 150 is illustrated in FIGS. 10, 11, 13 and 14.

A single part hinge 150 having a shank 151 and a foot 152 connected together by a flexural arrangement 153. The flexural arrangement 153 has forward extending strips 154 and rearward extending strips 155 forming an X. When a force is applied to the flexural arrangement 153 both the forward extending strips 154 and the rearward extending strips 155 flex.

Figure 12:
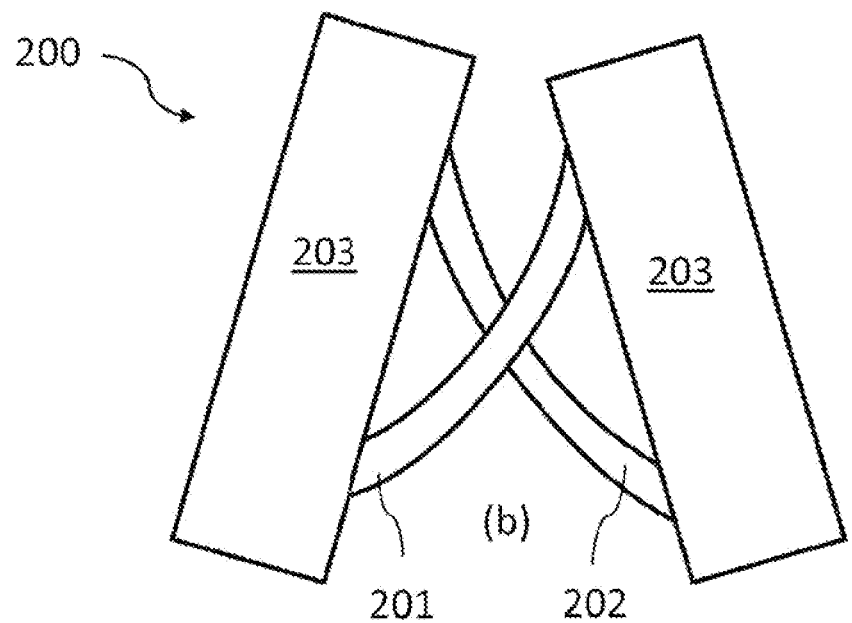
FIG. 12 is a schematic illustration of a flexural arrangement, where
Figure 12:
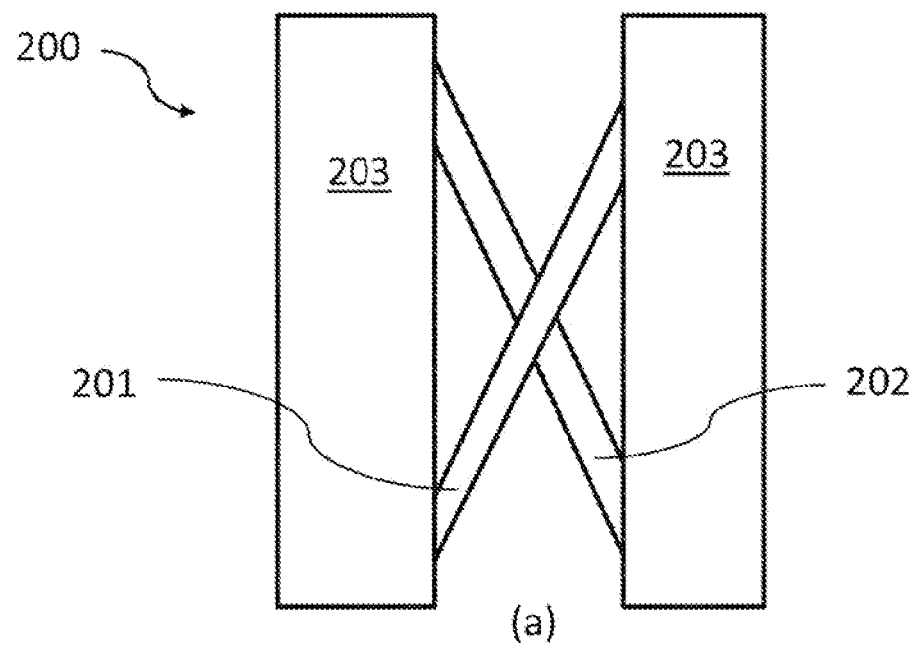
Figure 13:
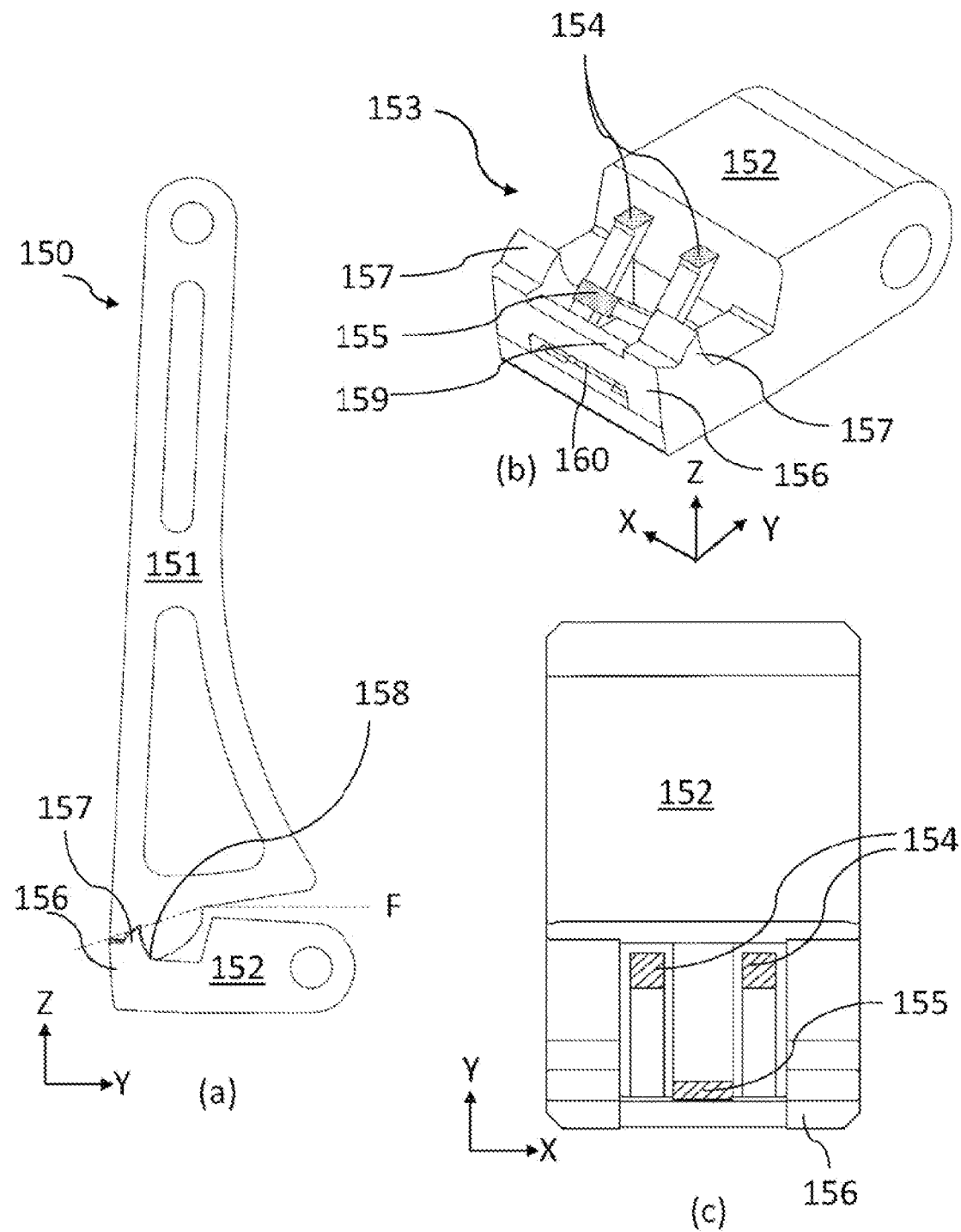
FIG. 13 illustrates the single part hinge of FIGS. 10 and 11, where
Figure 14:
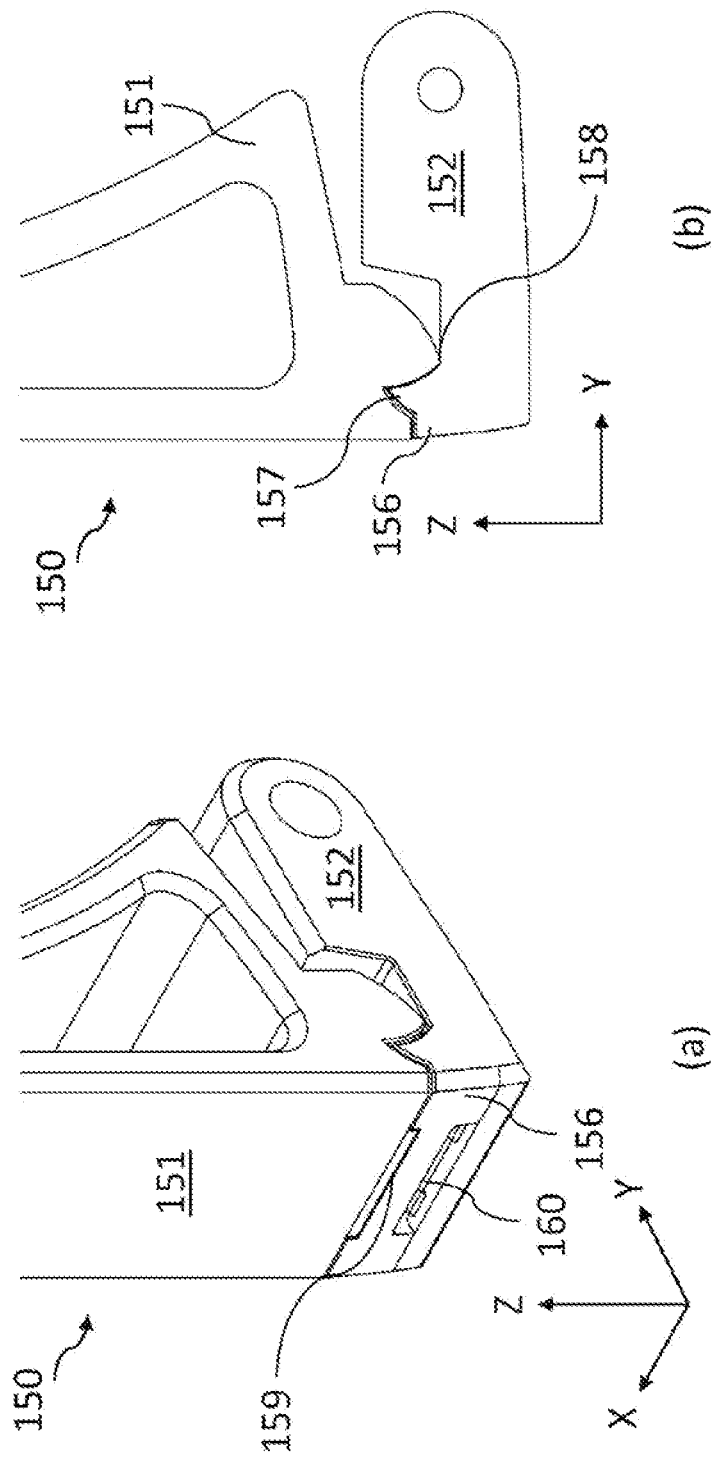
FIG. 14 illustrates a detail of the single part hinge of FIGS. 10, 11 and 13, where
Figure 15E:
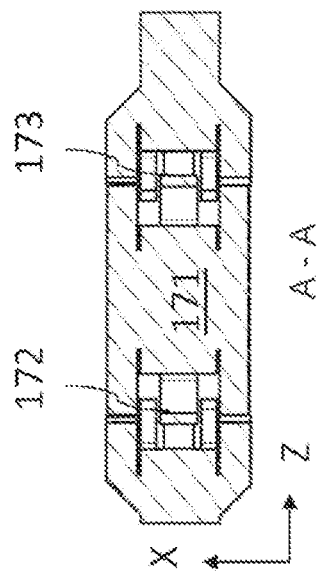
FIG. 15e is a ZX cross-section view.
Figure 15D:
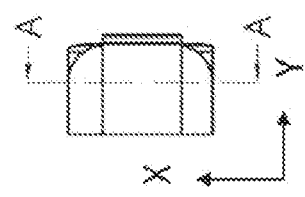
FIG. 15d is a XY top view.
Figure 15A:
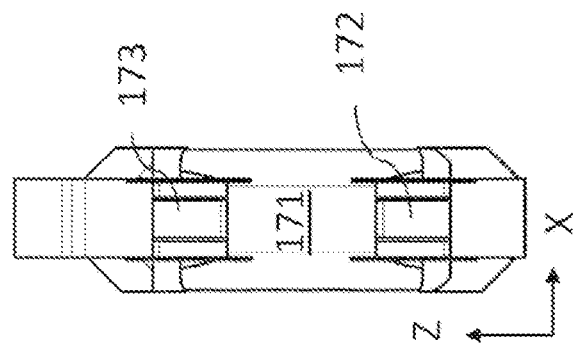
FIG. 15a is a ZX front view.
Figure 15B:
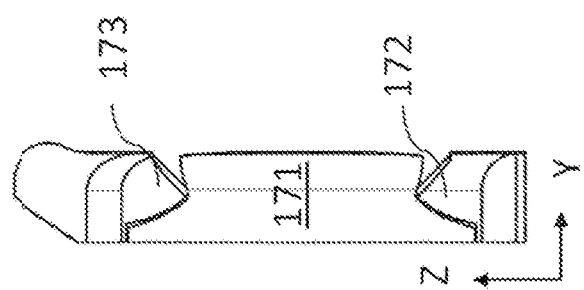
FIG. 15b is a ZY view.
Figure 15C:
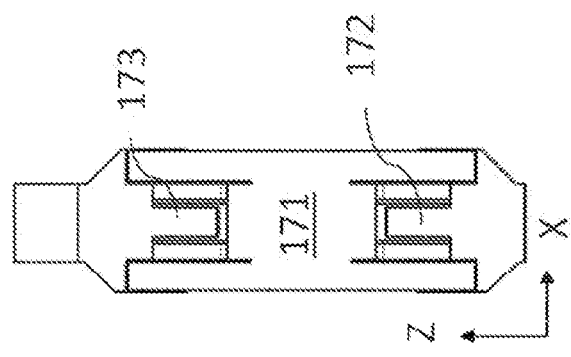
FIG. 15c is a ZX rear review.

FIG. 12 is a schematic illustration of a flexural arrangement 200, where the arrangement is at rest or static i.e. unloaded with no force applied in FIG. 12a and flexed in FIG. 12b, where a rotational force is applied. The illustration has forward extending strips 201 and rearward extending strips 202, connecting and extending between two blocks of material 203. When a force is applied both the forward extending strips 201 and the rearward extending strips 202 flex to rotate one block 203 about the other block 203. The pivot point is at the centre of the X.

Looking again at the single part hinge 150, when the single part hinge 150 is in a configuration for the raised or lowered positions of a linkage-set, the flexural arrangement is unloaded, and when the single part hinge 150 is in a configuration for the parked position of the linkage-set, the flexural arrangement is flexed.

FIGS. 11b-d are detailed views of section A of FIG. 11a, in cross-section view. FIG. 11b is in the raised position and the flexure arrangement 153 is unloaded, FIG. 11c is in the parked position and the flexure arrangement 153 is loaded, and FIG. 11d is in the lowered position and the flexure arrangement 153 is again unloaded.

Referring particularly to the detail shown in FIGS. 13b and 13c which show a cross section taken through the line F in FIG. 13a, it may be seen that the flexure arrangement 153 comprises two forward extending strips 154 and one rearward extending strip 155. The forward extending strips 154 are on either side of the rearward extending strip 155, and there is a gap between the each of the strips 154, 155 and between the strips 154 and the surrounding areas of the single part hinge 150. In this way, there should be substantially no frictional forces to overcome to move the hinge between positions.

When the single part hinge 150 is configured with the shank 151 perpendicular to the foot 152 as shown in FIG. 13a, the shank 151 is fully engaged with a support region. The interface between the shank 151 and the foot 152 are designed to fit together. The support region is made up of a back rest 156 and a shark tooth 157 extending from the foot 152. Thus, load carried through the single part hinge 150 is directed around the flexural arrangement 153 and is carried by structural parts of the single part hinge when the wheels are raised or lowered. Along the back of the heel, there is a step or castellation 159 along the interface of the back rest 156 to assist in ensuring that the shank 151 and the foot 152 come together properly and without twisting the flexural arrangement 153.

Similarly to the single part hinges 130, 140, when the single part hinge 150 is in the park position, the lower front or shin surface of the shank 151 rests against the top of the foot 152.

As noted above, the pivot point of the flexural arrangement 153 is at the centre of the X. On the exterior of the single part hinge 150, this corresponds to point 158 where the shank 151 meets the foot 152 at a point. The point may rock between positions in the space between the shark tooth 157 and the forefoot.

The single part hinge 150 is unable to rotate beyond the perpendicular in the anticlockwise direction due to the back rest 156 and the single part hinge 150 is unable to rotate past the top of the foot in the clockwise direction.

A letter box, or window 160 is arranged below the castellation 159 to reduce the overall weight of the single part hinge and to allow better access to the flexural arrangement 153. For example, the window 160 may be used for removal of excess material during manufacture, and for inspection.

It will be appreciated that the direction change mechanism for a load-handling device could comprise a combination of different linkage-sets of the type described herein, employing a series of single part hinges, or of one or more other types, for example, compliant mechanisms, other flexural arrangements or fixed-pin pivot point linkage mechanisms.

Figure 16:
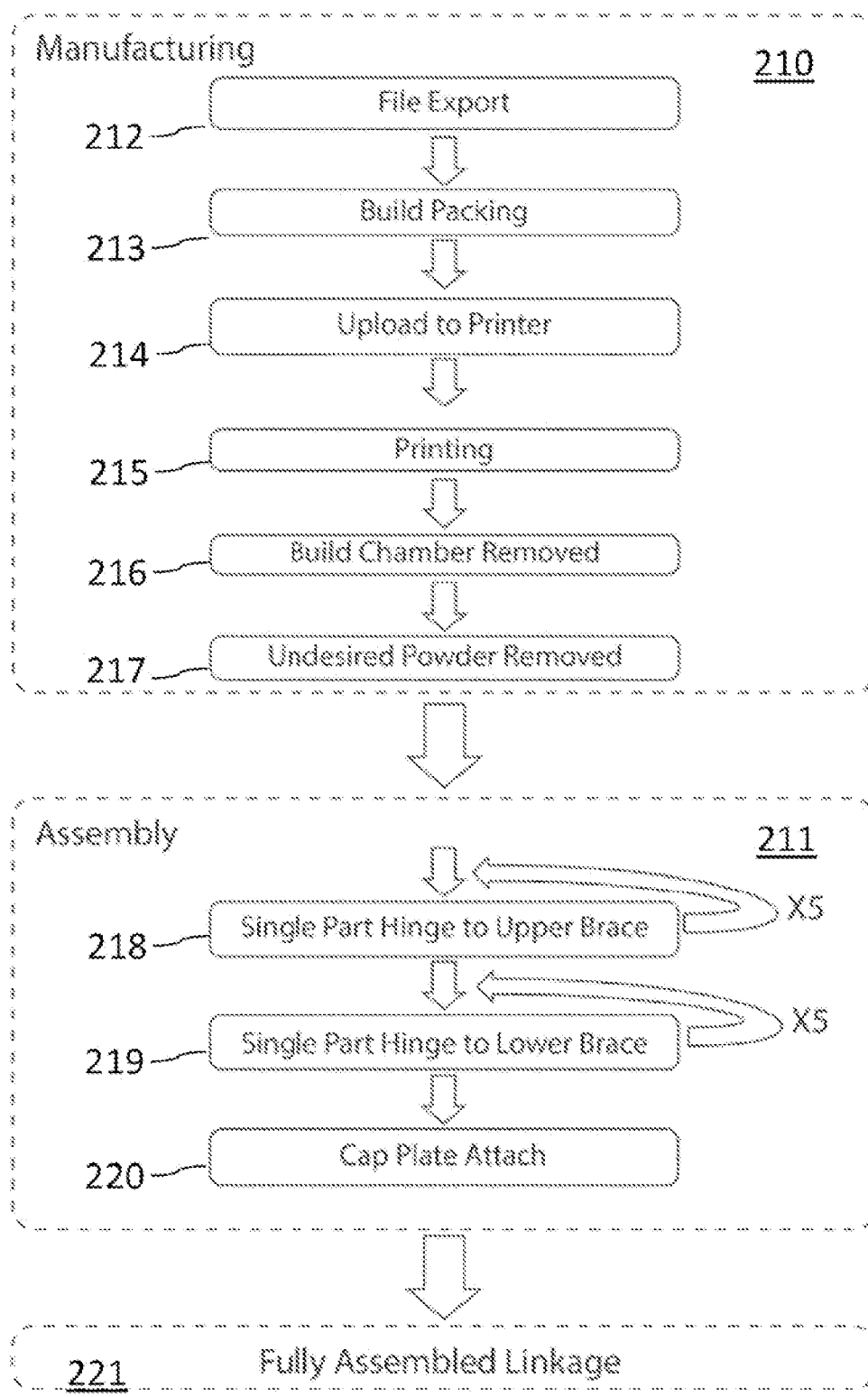
FIG. 16 illustrates a diagram of a manufacturing and assembly process.

FIG. 16 illustrates a diagram of an additive manufacturing process 210 for manufacturing single part hinges 130, 140, 150 and assembly process 211 for assembling the single part hinges 130, 140, 150 into linkage sets and a direction-change assembly for a load handling device.

To begin, regardless of the specific manufacturing technique, a particular single part hinge 130, 140, 150 is designed as a digital model, for example, as a CAD file. The digital model file is exported 212 to the additive manufacturing apparatus in a compatible format.

Initially, the additive manufacturing apparatus uses build packing 213 software to enable parts to be arranged optimally in the build chamber of the apparatus. It will be appreciated that the size and number of pieces possible to print will be dependent on the build chamber of the additive manufacturing apparatus. The parts may be arranged by the build packing software automatically. However, the designer may manually intervene to arrange parts with a specific orientation within the build chamber.

Once the arrangement is determined, the build may then be uploaded to the print software 214. In an SLS additive manufacturing apparatus, the print is configured as 'sliced' layers of material. During printing 215 powdered material in the build chamber is heated to just below the melting point of the material. A laser is used to push selected regions over the melting point to sinter the material. During the process, unsintered powered is left in place around the sintered material, and acts to support the sintered material.

Then the build chamber is removed 216 containing all the parts. Optionally, the build chamber may be left in the manufacturing apparatus to cool for a period before it is removed.

Once cooled, excess or undesired powder is removed 217 from the parts. The excess is unsintered support material. The excess is removed in a tumbling machine. Further excess material is removed manually. The single part hinge 130, 140, 150 is then ready for assembly.

Prior to assembly, where the single part hinge 130, 140, 150 has been manufactured with joined first portion and second portion at the heel interface, the join is split to allow movement between the first portion and the section portion so that the single part hinge can move between the first position and the second position.

For assembly 211 into a linkage set 120, an upper brace 122 is prepared with aluminium shafts to act as pivot points. A single part hinge 130, 140, 150 is slotted onto the upper brace 122, about an aluminium shaft 218. This process is repeated five times for a linkage set 120 comprising five single part hinges 130, 140, 150. It will be appreciated that a linkage set 120 may two or more single part hinges 130, 140, 150, however, a linkage set 120 with five single part hinges 130, 140, 150 is illustrated herein.

Similarly, a lower brace 122 is prepared with aluminium shafts to act as pivot points. A single part hinge 130, 140, 150 is slotted onto the upper brace 123, about an aluminium shaft 219. This process is repeated for each of the single part hinges 130, 140, 150.

Finally, a cap plate is attached 220 to the upper brace 122 and a cap plate is attached 220 to the lower brace 123 to provide a complete fully assembled linkage set 221, substantially as described in connection with FIG. 7.

Four linkage sets 221, one for each side of load handling device, may be assembled into a direction-change assembly, substantially as described in connection with FIG. 6.

It will be appreciated that the various arrangements of the single part hinge described here can be put to any number of uses in mechanical linkages. FIG. 15 illustrates a single part linkage 170 employing two single part hinges. Similarly to the examples described above, a first single part hinge 172 is formed at one end of a first portion 171, and a second single part hinge 173 is formed at the distal end of the first portion 171. Thus the single part linkage 170 may be considered to be a double single part hinge or linkage. Both of the single part hinges 172, 173 comprises a flexural arrangement 174.

As illustrated in FIGS. 15a-i, which show various views and cross-sections of the single part linkage 170, the first single part hinge 172 and the second single part hinge 173 are arranged to rotate in the same direction, thus the double single part linkage 170 is a poly-articulated (in this case, bi-articulated) chain, and resembles a finger. When the two single part hinges 172, 173 are both flexed, the single part linkage 170 will form an arch.

It will be appreciated that any number of additional single part hinges may be added to one or another end of the chain. Furthermore, within a poly-articulated chain or single part linkage, the flexural arrangements between each portion of the chain may be arranged to flex or bend in different directions. Still further, while in the examples described and illustrated herein, the portions are substantially linear, it is anticipated that one or more portions could be curved or complex shapes.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

It will be appreciated that a single part hinge or single part linkage can be designed for a particular application using various combinations of devices and arrangements described above. It will be appreciated that the features described hereinabove may all be used together in a single system. In other embodiments of the invention, some of the features may be omitted. The features may be used in any compatible arrangement. Many variations and modifications not explicitly described above are possible without departing from the scope of the invention as defined in the appended claims.

The invention claimed is:

1. A single part hinge for a load handling device comprising:
a first portion and a second portion; and
a flexural arrangement including two or more strips of material extending between the first portion and the second portion, wherein at least one of the strips extends in a first direction and at least one of the strips extends in a second direction different to the first direction, wherein the at least one strip extending in the first direction is opposed to the at least one strip extending in the second direction, and wherein the two or more strips connect a first end of the first portion to a first end of the second portion;
wherein the single part hinge is configured to be rotationally movable about a pivot point at the first end of the first portion, and to be moveable between a first position and a second position,
wherein in the first position, rotation is limited by a first support region, the first support region of the second portion being a shark-tooth shaped protrusion, the first support region of the first portion being a complementary shaped recess for guiding the first portion to the first position,
wherein in the second position, rotation is limited by a second support region, and
wherein the flexural arrangement is at least partially nested within the first end of the first portion or within the first end of the second portion.

2. A single part hinge according to claim 1, wherein an interface between the first portion and the second portion at the second support region includes a complementary shape.

3. A single part hinge according to claim 1, wherein the flexural arrangement is at least partially bounded on lateral sides by the first support region.

4. A single part hinge according to claim 1, wherein the two or more strips of the flexural arrangement comprises:
a single strip extending in the first direction, and two strips each extending in the second direction, and the strip extending in the first direction has a width equal to a combined width of the two strips extending in the second direction.

5. A single part hinge according to claim 1, wherein each strip of the flexural arrangement is separated from other features by a gap at each side along its length.

6. A single part hinge according to claim 1, wherein the first portion, the second portion and the flexural arrangement are formed from a single piece of material.

7. A single part hinge according to claim 1, wherein the single part hinge possesses 3D printed features, or additive manufacturing features.

8. A single part hinge according to claim 1, wherein the first portion comprises:
a window arranged for removal of excess material.

9. A linkage set for transferring horizontal force to vertical movement comprising at least one single part hinge according to claim 1.

10. The linkage set according to claim 9, wherein the linkage set comprises:
a direction-change mechanism.

11. A single part hinge according to claim 1, in combination with a load-handling device for lifting and moving storage containers stacked in a grid framework structure having a first set of parallel rails or tracks and a second set of parallel rails or tracks extending substantially perpendicularly to the first set of rails or tracks in a substantially horizontal plane to form a grid with a grid pattern containing a plurality of grid spaces,
wherein the grid is supported by a set of uprights to form a plurality of vertical storage locations beneath the grid for containers to be stacked between and be guided by the uprights in a vertical direction through the plurality of grid spaces,
the load handling device comprising:
a body mounted on a first set of wheels being configured and arranged to engage with the first set of parallel tracks, and a second set of wheels being configured and arranged to engage with the second set of parallel tracks; and
a direction-change assembly configured and arranged to raise and/or lower the first set of wheels, and/or lower or raise the second set of wheels with respect to the body to engage and disengage the wheels with parallel tracks, wherein the direction-change assembly includes a linkage-set including a series of the single part hinges arranged between a traveller and a fixed brace, wherein the traveller is configured and arranged to move under an applied force to enable at least one of the wheels of the first and second sets to be raised or lowered.

12. A method of manufacturing a single part hinge for a load handling device including a first portion and a second portion; and a flexural arrangement including two or more strips of material extending between the first portion and the second portion, wherein at least one of the strips extends in a first direction and at least one of the strips extends in a second direction different to the first direction, wherein the at least one strip extending in the first direction is opposed to the at least one strip extending in the second direction, and wherein the two or more strips connect a first end of the first portion to a first end of the second portion;
wherein the single part hinge is configured to be rotationally movable about a pivot point at the first end of the first portion, and to be moveable between a first position and a second position, wherein in the first position, rotation is limited by a first support region, the first support region of the second portion being a shark-tooth shaped protrusion, the first support region of the first portion being a complementary shaped recess for guiding the first portion to the first position, wherein in the second position, rotation is limited by a second support region, and wherein the flexural arrangement is at least partially nested within the first end of the first portion or within the first end of the second portion, the method comprising:
printing the single part hinge from a digital model of the single part hinge using additive manufacturing apparatus; and
removing the printed single part hinge from the additive manufacturing apparatus; and
removing excess material from the single part hinge.

\* \* \* \* \*